(12) United States Patent
Perry et al.

(10) Patent No.: US 9,143,175 B2
(45) Date of Patent: Sep. 22, 2015

(54) RATELESS AND RATED CODING USING SPINAL CODES

(71) Applicants: Jonathan Perry, Cambridge, MA (US); Devavrat Shah, Newton, MA (US); Hari Balakrishnan, Belmont, MA (US)

(72) Inventors: Jonathan Perry, Cambridge, MA (US); Devavrat Shah, Newton, MA (US); Hari Balakrishnan, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/230,165

(22) Filed: Mar. 31, 2014

(65) Prior Publication Data

US 2014/0211881 A1    Jul. 31, 2014

Related U.S. Application Data

(62) Division of application No. 13/399,436, filed on Feb. 17, 2012, now Pat. No. 8,724,715.

(60) Provisional application No. 61/443,999, filed on Feb. 17, 2011.

(51) Int. Cl.
| | | |
|---|---|---|
| H04B 15/00 | (2006.01) | |
| H04B 1/10 | (2006.01) | |
| H04L 1/00 | (2006.01) | |
| H04L 5/16 | (2006.01) | |
| H04L 27/34 | (2006.01) | |

(52) U.S. Cl.
CPC ............ *H04B 1/10* (2013.01); *H04B 15/00* (2013.01); *H04L 1/004* (2013.01); *H04L 1/0007* (2013.01); *H04L 1/0054* (2013.01); *H04L 1/005* (2013.01); *H04L 1/0042* (2013.01); *H04L 5/16* (2013.01); *H04L 27/34* (2013.01)

(58) Field of Classification Search
CPC .. H04B 3/32; H04L 25/03343; H04L 1/0618; H04L 1/0057; H03M 13/116
USPC ........... 375/285, 267, 296, 346; 714/752, 758
See application file for complete search history.

(56) References Cited

U.S. PATENT DOCUMENTS

| | | |
|---|---|---|
| 6,029,264 A | 2/2000 | Kobayashi et al. |
| 6,765,507 B2 | 7/2004 | Yokokawa et al. |
| 7,206,364 B2 * | 4/2007 | Miller ........................... 375/341 |
| 7,239,667 B2 | 7/2007 | Shen et al. |
| 7,318,185 B2 | 1/2008 | Khandani et al. |
| 7,372,802 B2 | 5/2008 | Breiling et al. |
| 7,564,775 B2 | 7/2009 | Jayaraman et al. |
| 7,627,056 B1 | 12/2009 | Harris et al. |
| 7,711,066 B2 | 5/2010 | Jiang et al. |
| 7,954,016 B2 | 5/2011 | Pan et al. |
| 7,957,482 B2 | 6/2011 | Golitschek Edler Von Elbwart et al. |

(Continued)

OTHER PUBLICATIONS

Invitation to Pay Additional Fees of the ISA for PCT/US2012-025612 dated May 31, 2012.

(Continued)

*Primary Examiner* — Khai Tran
(74) *Attorney, Agent, or Firm* — Daly, Crowley, Mofford & Durkee, LLP

(57) ABSTRACT

In one aspect, a wireless system includes an encoder configured to encode data using a spinal code which uses a function over the message bits to directly produce a sequence of constellation symbols for transmission. The wireless system also includes a decoder configured to decode the spinal code. The function may be at least one of a non-linear function and a hash function.

9 Claims, 13 Drawing Sheets

(56) References Cited

U.S. PATENT DOCUMENTS

| | | | |
|---|---|---|---|
| 7,986,752 | B2 | 7/2011 | Nikopour-Deilami et al. |
| 8,040,981 | B2 | 10/2011 | Amiri et al. |
| 8,090,049 | B2 | 1/2012 | Kent et al. |
| 8,209,580 | B1 | 6/2012 | Varnica et al. |
| 8,261,079 | B2 | 9/2012 | Newman et al. |
| 8,315,325 | B2 | 11/2012 | Lee et al. |
| 8,385,445 | B2 | 2/2013 | Vitale et al. |
| 8,468,396 | B2 | 6/2013 | Wu et al. |
| 8,503,552 | B2 | 8/2013 | Pfletschinger |
| 8,537,787 | B2 | 9/2013 | Qu et al. |
| 8,537,919 | B2 | 9/2013 | Fonseka et al. |
| 8,559,543 | B1 | 10/2013 | Lee et al. |
| 8,599,946 | B2 | 12/2013 | Kim et al. |
| 8,683,274 | B1 | 3/2014 | Varnica et al. |
| 8,693,559 | B2 | 4/2014 | Shaw et al. |
| 8,724,715 | B2 | 5/2014 | Perry et al. |
| 8,761,318 | B2 | 6/2014 | Drumm et al. |
| 8,792,325 | B1 | 7/2014 | Narasimhan |
| 8,797,972 | B2 | 8/2014 | Kwon et al. |
| 8,798,201 | B2 | 8/2014 | Kim |
| 8,799,735 | B2 | 8/2014 | Wu et al. |
| 8,811,509 | B2 | 8/2014 | Shen et al. |
| 8,848,842 | B2 | 9/2014 | Dick |
| 8,891,763 | B2 | 11/2014 | Tomlinson et al. |
| 2001/0033621 | A1 | 10/2001 | Khayrallah |
| 2003/0138055 | A1* | 7/2003 | Saito et al. ............ 375/262 |
| 2005/0135498 | A1 | 6/2005 | Yee |
| 2006/0048038 | A1 | 3/2006 | Yedidia et al. |
| 2006/0153312 | A1 | 7/2006 | Yun et al. |
| 2006/0205357 | A1 | 9/2006 | Kim |
| 2007/0149242 | A1 | 6/2007 | Kim et al. |
| 2008/0165878 | A1 | 7/2008 | Kajihara |
| 2008/0233966 | A1 | 9/2008 | Scheim et al. |
| 2008/0260053 | A1 | 10/2008 | Yun et al. |
| 2009/0199069 | A1 | 8/2009 | Palanki et al. |
| 2009/0257530 | A1 | 10/2009 | Shim et al. |
| 2010/0067614 | A1 | 3/2010 | Koslov et al. |
| 2010/0100792 | A1 | 4/2010 | Abu-Surra |
| 2012/0063429 | A1 | 3/2012 | Yang et al. |
| 2012/0106684 | A1 | 5/2012 | Eckert |
| 2012/0213307 | A1 | 8/2012 | Perry et al. |
| 2013/0099901 | A1 | 4/2013 | Jones et al. |
| 2013/0145239 | A1 | 6/2013 | Pi et al. |
| 2013/0259149 | A1 | 10/2013 | Dhakal et al. |
| 2013/0315347 | A1 | 11/2013 | Fleming et al. |
| 2013/0326630 | A1 | 12/2013 | Argon |
| 2014/0072076 | A1 | 3/2014 | Taherzadehboroujeni et al. |
| 2014/0169492 | A1 | 6/2014 | Mahdavifar et al. |
| 2014/0205036 | A1 | 7/2014 | Kim |
| 2014/0247910 | A1 | 9/2014 | Drumm et al. |
| 2014/0334421 | A1 | 11/2014 | Sosa et al. |
| 2014/0369434 | A1 | 12/2014 | Taherzadehboroujeni et al. |
| 2015/0003557 | A1 | 1/2015 | Perry et al. |
| 2015/0016577 | A1 | 1/2015 | Varadaharajan et al. |

OTHER PUBLICATIONS

International Search Report of the ISA for PCT/US2012/025612 dated Jul. 27, 2012.
Written Opinion of the ISA for PCT/2012/025612 dated Jul. 27, 2012.
Notification Concerning Transmittal of the International Preliminary Report on Patentability (including the IPRP and the Written Opinion of the ISA) dated Aug. 29, 2013 for International Pat. Appl. No. PCT/US2012/025612.
Non-Final Office Action dated Jun. 17, 2013 for U.S. Appl. No. 13/399,436.
Response to the Office Action dated Jun. 17, 2013 for U.S. Appl. No. 13/399,436.
Non-Final Office Action dated Oct. 29, 2013 for U.S. Appl. No. 13/399,436.
Response to the Office Action dated Oct. 29, 2013 for U.S. Appl. No. 13/399,436.
Supplemental Response to the Office Action dated Oct. 29, 2013 for U.S. Appl. No. 13/399,436.
Notice of Allowance and Fees Due for U.S. Appl. No. 13/399,436.
U.S. Appl. No. 13/399,436.
Office Action dated Jul. 31, 2014 for U.S. Appl. No. 13/901,667, filed May 24, 2013 9 pages.
U.S. Appl. No. 14/314,347, filed Jun. 25, 2014, Perry et al.
Bahl et al.; "Optimal Decoding of Linear Codes for Minimizing Symbol Error Rate;" IEEE Transactions on Information Theory; Mar. 1974; pp. 284-287.
Berrou et al.; "Near Shannon Limit Error—Correcting Coding and Decoding: Turbo-Codes (1);" IEEE International Conference on Communication; May 1993; pp. 164-170.
Cheng et al.; "A 0.077 to 0.168 nJ/bit/iteration Scalable 3GPP LTE Turbo Decoder with an Adaptive Sub-Block Parallel Scheme and an Embedded DVFS Engine;" Massachusetts Institute of Technology, Dept. of Electrical Engineers and Computer Science; Sep. 2010; 5 sheets.
Cypher et al.; "Generalized Trace-Back Techniques for Survivor Memory Management in the Viterbi Algorithm;" Journal of Very Large Scale Integration Signal Processing Systems, vol. 5, Issue 1; Jan. 1993; pp. 85-94.
Forney, Jr.; "The Viterbi Algorithm;" Proceedings of the IEEE, vol. 61, No. 3; Mar. 1973; pp. 268-278.
Lin et al.; "A 1000-Word Vocabulary, Speaker-Independent, Continuous Live-Mode Speech Recognizer Implemented in a Single FPGA;" Proceedings of the 2007 AMC/SIGDA 15th International Symposium on Field Programmable Gate Arrays; Jan. 2007; 9 pages.
Ng et al.; "From WiFi to WiMAX: Techniques for High-Level IP Reuse Across Different OFDM Protocols;" IEEE/ACM International Conference on Formal Methods and Models for Codesign; May 2007; 10 sheets.
Paaske; "An Area-Efficient Path Memory Structure for VLSI Implementation of High Speed Viterbi Decoders;" Integration, the Very Large Scale Integration Journal, vol. 12, No. 2; Jan. 1991; pp. 79-91.
Perez et al.; VLSI Architecture for the M Algorithm Suited for Detection and Source Coding Applications; IEEE Proceedings of the 14th International Conference on Electronics, Communications and Computers; Jan. 2005; 6 sheets.
Perry et al.; Spinal Codes; Special Interest Group on Communications 12; Aug. 2012; pp. 49-60.
Power et al.; "Reduced Complexity Path Selection Networks for M-Algorithm Read Channel Detectors;" IEEE Transactions on Circuits and Systems—I: Regular Papers, vol. 55, No. 9; Oct. 2008; pp. 2924-2933.
PCT Partial Search Report of the ISA dated May 31, 2012; for PCT Pat. App. No. PCT/US2012-025612.
PCT Search Report and Written Opinion of the ISA dated Jul. 27, 2012; for PCT Pat. App. No. PCT/US2012/025612.
PCT International Preliminary Report on Patentability and Written Opinion dated Aug. 29, 2013 for PCT Pat. Appl. No. PCT/US2012/025612.
U.S. Appl. No. 11/619,675; 300 pages; Part 1 of 3.
U.S. Appl. No. 11/619,675; 300 pages; Part 2 of 3.
U.S. Appl. No. 11/619,675; 209 pages; Part 3 of 3.
U.S. Appl. No. 12/629,374; 300 pages Part 1 of 7.
U.S. Appl. No. 12/629,374; 300 pages Part 2 of 7.
U.S. Appl. No. 12/629,374; 300 pages Part 3 of 7.
U.S. Appl. No. 12/629,374; 300 pages Part 4 of 7.
U.S. Appl. No. 12/629,374; 300 pages Part 5 of 7.
U.S. Appl. No. 12/629,374; 300 pages Part 6 of 7.
U.S. Appl. No. 12/629,374; 252 pages Part 7 of 7.
Response filed Nov. 19, 2014; to Office Action dated Jul. 31, 2014; for U.S. Appl. No. 13/901,667 29 pages.
Office Action dated Mar. 6, 2015; for U.S. Appl. No. 14/314,347; 21 pages.
Final Office Action dated Feb. 4, 2015 corresponding to U.S. Appl. No. 13/901,667; 12 Pages.

\* cited by examiner

RATELESS AND RATED CODING USING SPINAL CODES

RELATED APPLICATIONS

This application is a divisional application of U.S. patent application Ser. No. 13/399,436 filed on Feb. 17, 2012 which claims priority to U.S. Provisional Application No. 61/443,999 filed on Feb. 17, 2011 and entitled, "RATELESS AND RATED CODING USING SPINAL CODES," which is incorporated herein by reference in its entirety.

BACKGROUND

As is known in the art, emerging technology and increasing demand for large-scale high-speed data communications have made it important for systems to achieve efficient and reliable digital data transmission and storage. In particular, an important goal for many wireless network protocols is high throughput. In communication networks, throughput (also sometimes referred to as "network throughput") may be defined as the average rate of successful message delivery over a communication channel.

As is also known, channel conditions affect network throughput. Many factors degrade channel quality, including signal attenuation, noise, interference, and multipath fading. Wireless channels vary with time, sometimes even at timescales shorter than a packet time. Thus, to achieve high throughput, a protocol must not only operate at the best rate given a set of channel conditions but must also adapt to variations.

These problems are well-known, fundamental ones. Current wireless networks, including IEEE Standard 802.11 (Wi-Fi) and various wide-area cellular wireless standards, address them by providing a large number of physical layer (PHY) mechanisms, including a variety of channel codes, various parameters for these codes, and several modulations. The link and subnetwork layers implement policies to dynamically select and configure the discrete choices and parameters provided by the PHY. In 802.11 networks, for instance, this choice is generally made by a bit rate adaptation protocol by observing channel conditions, such as the signal-to-noise ratio (SNR), interference-free bit error rate, dispersion in the constellation space, frame loss rate, or the time taken to successfully transmit a frame.

SUMMARY

In one aspect, a wireless system includes an encoder configured to encode data using a spinal code which uses a function over the message bits to directly produce a sequence of constellation symbols for transmission. The wireless system also includes a decoder configured to decode the spinal code. In one example, the function may be at least one of a non-linear function and a hash function. In one example, the spinal code may be used in a rateless or rated fashion. In one example, the decoder may be configured to provide feedback to the encoder.

In another aspect, a method of operating a wireless system, which includes a transmitter and a receiver, includes transmitting, via the transmitter, a spinal coded message over a wireless channel; and receiving, via the receiver, the spinal coded message over the wireless channel. In one example, the method may include providing feedback from the receiver to the transmitter. In one example, the method may also include, at a transmitter, generating a sequence of symbols using message bits; mapping each symbol to a constellation point; modulating constellation points on a carrier; and transmitting a signal using the carrier. In one example, the method may also include, at a receiver, mapping a signal from an encoder to points on an I-Q plane and decoding the points on the I-Q plane.

In a further aspect, a method to encode a message includes generating a sequence of symbols using message bits and mapping each symbol to a constellation point. In one example, the method may include modulating constellation points on a carrier and transmitting a signal using the carrier. In one example, the method may also include receiving feedback from a receiver and determining when to transmit based on an estimate of a distribution of the amount of symbols required to successfully decode. In one example, the method may further include dividing a message into non-overlapping segments of size k bits each, wherein k is an integer greater than zero, determining a series of n/k spine values, wherein n is an integer greater than zero and generating constellation points by making one or more passes over each of the n/k spine values.

In another further aspect, method to decode includes mapping a signal from an encoder to points on an I-Q plane and decoding the points on the I-Q plane. In one example, the decoding may include exploring a decoding tree iteratively; and pruning at each iteration all but a defined amount of nodes. In one example, the method may include providing feedback to the encoder.

In another aspect, an encoder includes a non-transitory machine-readable medium that stores executable instructions. The instructions cause a machine to generate a sequence of symbols using message bits and map each symbol to a constellation point. In one example, the encoder may include instructions causing a machine to modulate constellation points on a carrier and transmit a signal using the carrier. In one example, the encoder may further include instructions causing a machine to receive feedback from a decoder and to determine when to transmit based on an estimate of a distribution of the amount of symbols required to successfully decode. The encoder may still further include instructions causing a machine to divide a message into non-overlapping segments of size k bits each, wherein k is an integer greater than zero, determine a series of n/k spine values, wherein n is an integer greater than zero; and generate constellation points by making one or more passes over each of the n/k spine values.

In a still further aspect, a decoder includes a non-transitory machine-readable medium that stores executable instructions. The instructions cause a machine to map signals from an encoder to points on an I-Q plane and decode a sequence of points. In one example, the instructions causing the machine to decode may include instructions causing the machine to explore a decoding tree iteratively; and prune at each iteration all but a defined amount of nodes. In one example, the decoder may also include instructions causing a machine to provide feedback to the encoder.

In another aspect, a wireless system includes a transmitter that includes a non-transitory machine-readable medium that stores a first set of executable instructions. The first set of instructions cause a machine to obtain packets, divide a packet of N bits into multiple code blocks, include a cyclic redundancy check (CRC) for each code block, encode the code block in a rateless manner, determine how many passes and puncturing to send; and transmit encoded symbols to a receiver. In one example, the wireless system may include the receiver that includes a non-transitory machine-readable medium that stores a second set of executable instructions. The second set of instructions cause a machine to receive encoded symbols from the transmitter; decode the received symbols; check the CRCs; send a feedback signal to a transmitter if packets are not all successfully decoded; and send a final feedback signal to the transmitter if packets are successfully decoded.

BRIEF DESCRIPTION OF THE DRAWINGS

The foregoing features of this invention, as well as the invention itself, may be more fully understood from the following description of the drawings in which.

DETAILED DESCRIPTION

Figure 1:
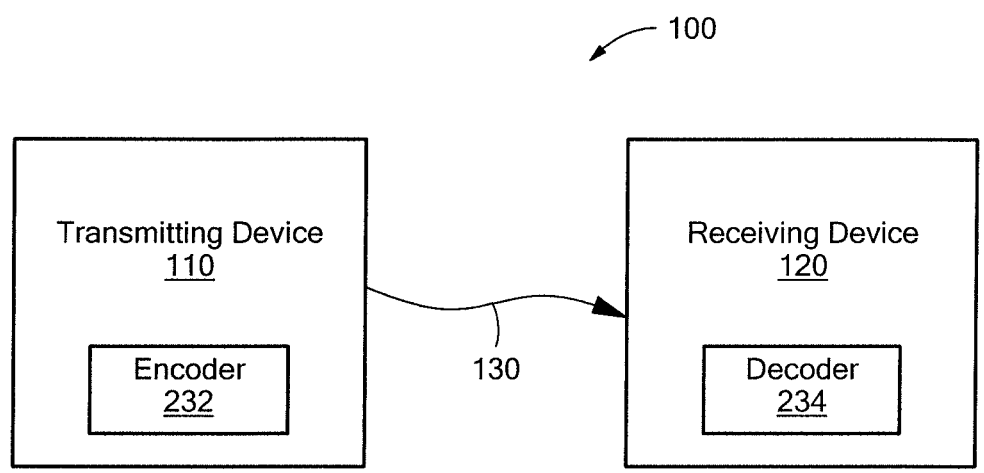
FIG. 1 is a block diagram of an example communication network.

The concepts, system and techniques described herein present a rateless system, which, without any explicit adaptation, solves a fundamental problem in communication networks (e.g., wireless networks) to develop communication protocols that achieve high throughput in the face of noise, interference, and time-varying channel conditions. In one embodiment, the sender encodes the data using a novel rateless code, the "spinal code," which uses, for example, a hash function over the message bits to directly produce a sequence of constellation symbols for transmission. The receiver and sender use a feedback protocol to efficiently determine whether any given coded chunk of data has been correctly decoded. While the techniques presented herein use a rateless approach to solve the aforementioned problems, one of ordinary skill in the art would recognize that a rated communication may be used as well.

In an ideal rateless wireless network, the sender starts transmitting packet data at a suitably high rate (generally higher than what the channel can currently sustain), and keeps going until the receiver determines that it has correctly decoded all the data and informs the sender to move to the next packet. Obvious to one of ordinary skill in the art, for this approach to work and achieve a high rate, the sender must encode and modulate the data in a way that allows the receiver to efficiently decode the data in the presence of channel impediments.

The concepts, systems and techniques described herein bring the current state of technology closer to these ideals by incorporating key concepts such as but not limited to: (1) a novel family of rateless codes, termed "spinal codes," (2) coding message bits directly to constellation symbols instead of using separate coding and modulation steps, (3) a rateless link protocol (RLP) to coordinate between sender and receiver; (4) a decoder that examines nodes at depths larger than 1 when making pruning decisions; and (5) when to stop for feedback based on an estimated distribution of code.

Regarding spinal codes, a sender encodes the data using a rateless code, which removes the need for making any decisions about the code rate. Spinal codes apply a hash function to blocks of the original message bits and some internal state to produce a mapping (e.g., nonlinear) between the message bits and coded bits. The use of hash functions enables a practically efficient encoder, and a practical near-maximum-likelihood decoder for spinal codes is described herein. An important difference between spinal codes and previously developed rateless codes is that spinal codes are effective even for small message sizes, on the order of hundreds of bits, which makes them well-suited for packet communication. Spinal codes are essentially capacity-achieving codes for additive white Gaussian noise (AWGN) channels, and are believed to be the first class of rateless codes that provably achieve near-capacity for AWGN channels with an efficient decoder. While the techniques presented herein use a hash function, one of ordinary skill in the art would recognize that other functions may be used as well. However, not every function may be best suited for enabling spinal codes to perform well. For example, a good hash function, h, would be able to incorporate more and more message bits while a good sequence of hash functions $(h_1, h_2, h_3, \ldots,)$, $H_i$, would produce different outputs for different inputs.

Regarding coding directly to constellation symbols, the techniques herein use spinal codes to encode message bits directly to constellation symbols, which is unlike most existing schemes (whether rated or rateless) that code messages to bits, and then separately map the bits to symbols using, e.g., a Gray code. An illustrative constellation diagram used herein is extremely dense (e.g., equivalent to QAM-$2^{20}$), so a lot of information can be conveyed when noise is low. When noise is high, robustness comes from the spinal code. One advantage of this technique is that the sender is not required to make any decision of what modulation scheme to use in light of (estimated) channel conditions, nor to estimate what these channel conditions might be.

According to the rateless link protocol (RLP), a sender and receiver operate by coordinating with each other. In particular, the sender needs to have an idea of how long it can transmit encoded symbols before pausing for feedback from the receiver, which may inform the sender that all the data (encoded symbols) has been decoded successfully. If the sender pauses too early, then capacity is wasted because it takes non-zero time for the feedback to be sent, especially when using common half-duplex radios. On the other hand, if the sender does not pause in time, the sender may waste capacity by sending for much longer than necessary. In the techniques described herein, RLP performs this coordination by adaptively determining when to pause for feedback.

1. System Architecture Overview

FIG. 1 is a simplified schematic block diagram of an example communication network 100, illustratively comprising a transmitting device 110 ("transmitter" or "sender") and a receiving device 120 ("receiver") interconnected by a communication link 130, such as wireless communication. For instance, encoded wireless signals may be propagated from transmitting device 110 to receiving device 120 to be decoded, each as described in detail herein. The transmitting and receiving devices, such as radios, mobile phones, computers, and so forth, may be in communication with each other via the wireless communication medium based on, for example, distance, signal strength, current operational status, location, and so forth, and may generally be composed of half-duplex devices (able to transmit and receive, but not simultaneously). Those skilled in the art will understand that any number of devices may be used in a communication network, and that the view shown herein is for simplicity.

Data communications (e.g., signals) may comprise packets, frames, information, audio signals, video signals, and so forth, and may generally be considered to be digital encoded communication for the purposes of the embodiments herein. The signals 130 may be exchanged among the devices of the network 100 using predefined wireless communication protocols such as, e.g., IEEE Standard 802.11, IEEE Standard 802.15.4, WiFi, WiMax (IEEE Standard 802.16e), Bluetooth®, various proprietary protocols and so forth. In this context, a protocol consists of a set of rules defining how the nodes interact with each other. While spinal codes may be used on top of existing standards, spinal codes (and RLP) may be used to replace the existing codes (and protocols) in new standards.

As will be further described herein the transmitting device 110 includes an encoder 232 to encode messages and the receiving device 120 includes a decoder 234 for decoding messages.

The rateless link protocol (RLP) described herein is by necessity different from the prior art, particularly in that RLP involves determining when to solicit feedback from the receiver. Through this may be avoided if full-duplex radios were standard, most current radios are half-duplex, and as such, the techniques described herein detail a practical rateless system that can work over such half-duplex radios as well.

2. Spinal Codes
2.1 Encoding

Figure 2:
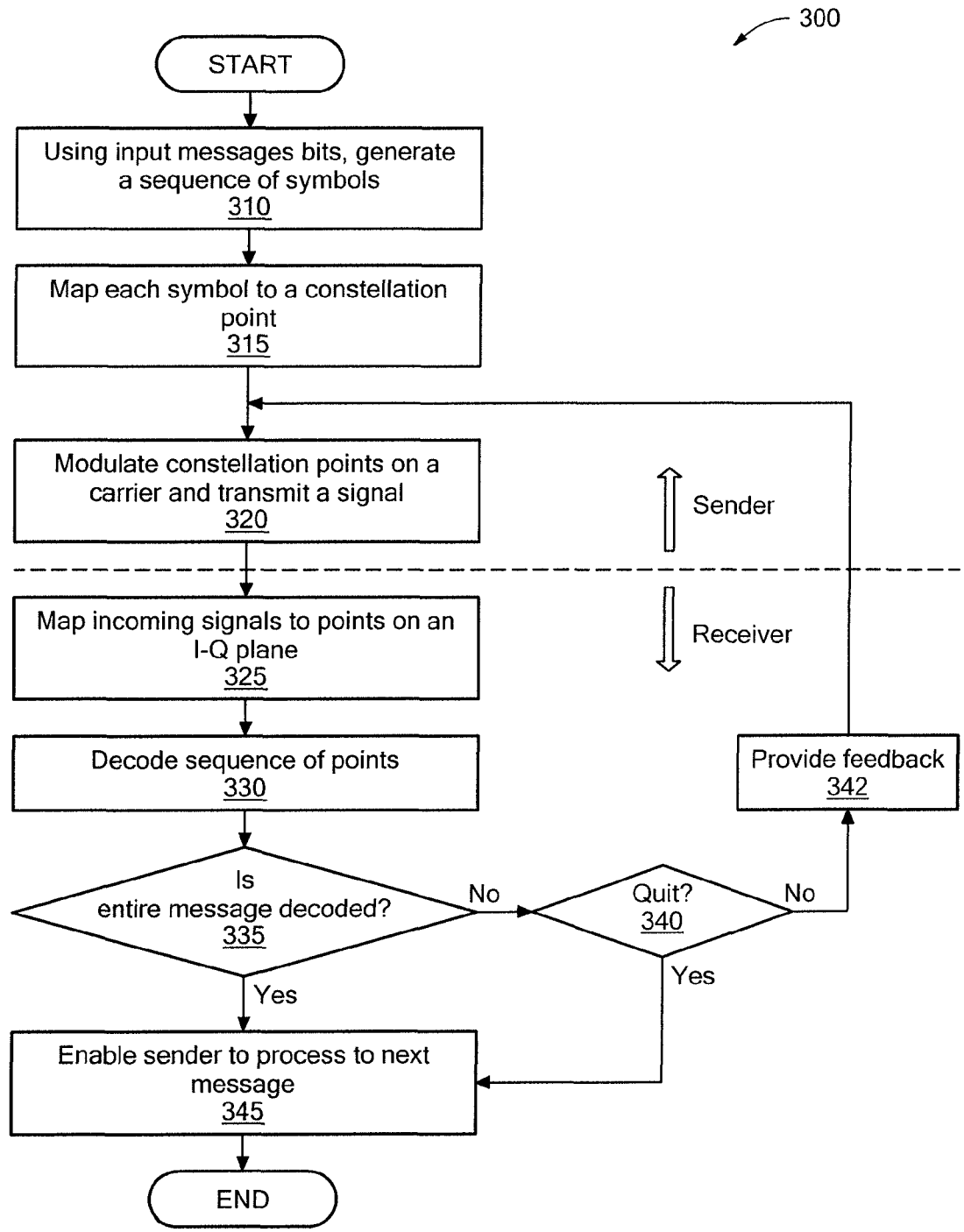
FIG. 2 is a flowchart of an example of a process to encode and to decode.

Referring to FIG. 2, an example of a process to encode and to decode is a process 300. In one example, processing blocks 310 to 320 are performed at a sender (e.g., the transmitting device 110) while processing blocks 325 to 345 are performed at a receiver (e.g., the receiving device 120).

Using input message bits, $M=m_1 m_2 \ldots m_n$, process 300 produces a sequence of symbols, where each symbol corresponds to some sequence of coded bits (310). Process 300 maps each symbol to a constellation point on an I-Q plane (315). A constellation point is a complex number, with the real and imaginary components signifying the in-phase, and quadrature components. Process 300 modulates each constellation point on a carrier and transmits the signal (320). Since spinal codes are rateless, an encoder can produce as many coded constellation points as necessary from a given sequence of message bits. Note that processing blocks 310 and 315 generally suggest an embodiment where all symbols are pre-generated. In other examples, the symbols are not pre-generated but rather generated in an ad hoc fashion.

Process 300 maps incoming signals to points on the I-Q plane (325). For example, a physical layer (PHY) of the receiver (e.g., the receiving device 120) maps the incoming signals. Process 300 decodes the points on the I-Q plane to produce an estimate of what the sender's message bits were (330). Process 300 determines if the entire message is decoded (335) and if the entire message is decoded, enables the sender to process the next message (345). As used herein a "message" means a sequence of bits that are coded. In general a packet may be divided to multiple independent coded messages, each of which constitutes a code block.

If the entire message is not encoded, process 300 determines whether to quit (340). For example, process 300 may quit if a predetermined amount of time has elapsed: either because the packet becomes irrelevant, or because it can be assumed that some failure has occurred (e.g., the other side went into a tunnel and cannot communicate). If process 300 determines to quit, process 300 proceeds to processing block 345. If process 300 determines not to quit, process 300 provides feedback (342).

In one specific embodiment, spinal codes may be characterized by one parameter that is generally specified by a user, which depends on the maximum rate desired for the communication link, where the "pre-coding stage" divides message M into smaller portions of size k. If the available bandwidth is W MHz and the desired maximum bit rate is $R_{max}$ M bits/s, then the maximum rate of the link is $k=R_{max}/W$ bits/symbol; i.e., k is the maximum rate (in bits/symbol) that the spinal code can achieve. An illustrative value for k may be fairly liberal; for instance, over the default IEEE Standard 802.11b/g bandwidth of 20 MHz, if k is chosen to be 8 bits/symbol, the maximum link bit rate will be 160 Megabits/s; if the bandwidth doubles to 40 MHz, the same k would provide a maximum bit rate of 320 Megabits/s. Similar performance can be obtained with k=4; i.e., 4 bits for the I component and 4 bits for the Q component of the symbol because I and Q are orthogonal to each other. With puncturing (explained below), higher rates can be achieved.

According to the techniques herein, the encoder and decoder agree a priori on two aspects of the invention: a first aspect that includes a hash function (and its initial seed value) and the functions $H_i$ that derive coded bits from the spine, and a second aspect that includes a deterministic constellation mapping between the output of the hash function and a symbol to be transmitted. Note that as used herein, the coded-bit sequences are called symbols. So, the illustrative coding process described herein takes message bits, codes them into symbols, then maps symbols to constellation points, and then each constellation point is modulated to a carrier and transmitted. In addition, in certain embodiments, the length of each symbol, C may be decided a priori, i.e., the number of coded bits that are incorporated into a single symbol. (This upper-bounds indicates how much information a single symbol can convey, i.e., the amount that should be achievable under zero noise.)

Figure 3A:
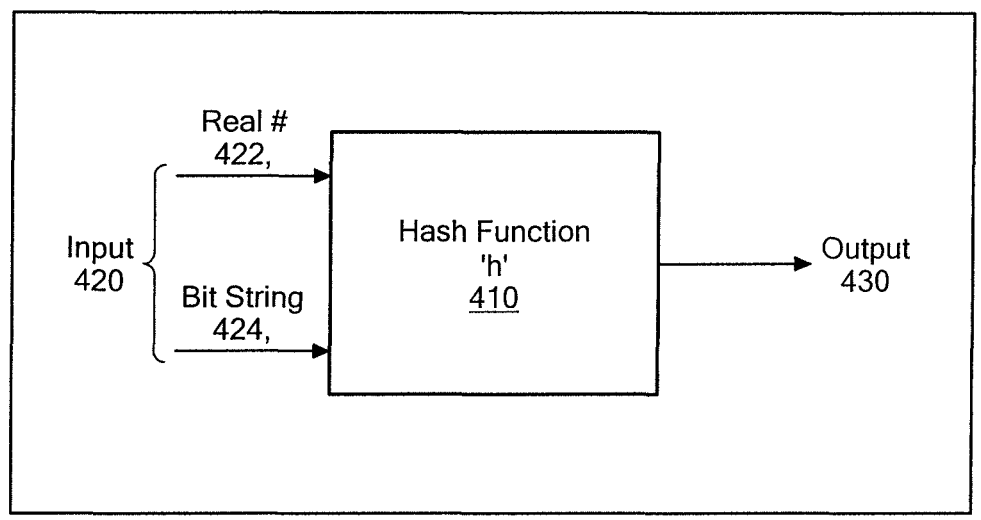
FIGS. 3A and 3B are block diagrams to illustrate various aspects of spinal code encoders.

FIG. 3A is an example of a hash function, h, which takes two inputs 420 ((i) a real number 422 between (0,1) and (ii) a bit-string 424 (from the message) of length k bits (the same k that defines the maximum rate)) and returns an output number 430 between (0,1). That is, $h: (0,1) \times \{0,1\}^k \to (0,1)$.

In certain examples, the input number in (0,1) and output generated in (0,1) will have finite precision. In certain examples, h is chosen uniformly at random, based on a random seed, from $\mathcal{H}$ family of hash functions.

Let $\tilde{m}=(m_1, \ldots, m_k)$ be a k-bit string (k≥1). The following standard assumptions may be made about the hash function:

(i) Uniformity. For any (s; m), (1)
$\mathbb{P}(h(s; \tilde{m}) \le x) = x$, for any $x \in (0, 1)$.

-continued (ii) Independence. For any $l \geq 2$ with $(s_i; \overline{m}_i)$ for $1 \leq i \leq l$, (2)

$$\mathbb{P}\left(\bigcap_{i=1}^{l} h(s_i; \overline{m}_i) \leq x_i\right) = \prod_{i=1}^{l} x_i,$$

when $(s_i; \overline{m}_i) \neq (s_j; \overline{m}_j)$ for $1 \leq i \neq j \leq l$ with $x_i \in (0, 1)$ for $1 \leq i \leq l$. Here by $(s; \overline{m}) \neq (s'; \overline{m}')$ we mean either $s \neq s'$ or $\overline{m}$ and $\overline{m}'$ differ in at least one bit.

The encoder and decoder agree on an initial value for the first argument to h, denoted $s_0$, which may be assumed to be 0 (zero) without loss of generality.

According to the second noted aspect, the encoder and decoder also agree on a deterministic mapping that generates a constellation point on the I-Q plane based on the number generated by hash function ("constellation mapping"). In one embodiment, a 2C bit number is used as input to a constellation mapping function, $f$, which generates output in $(-P^*, P^*) \times (-P^*, P^*)$, where the constellation points are all within the square whose opposite corners are $(-P^*, -P^*)$ and $(P^*, P^*)$. In this scheme, $P^*$ is the maximal limit on the modulated signal the transmitter can send. When the number of constellation points in this square is large, a simple calculation shows that the average power per I-Q symbol, assuming that all symbols are equally likely (a property achieved by the code described herein), is equal to $\frac{2}{3}(P^*)^2$. This power is equal in each dimension; i.e., $\frac{1}{3}(P^*)^2$ per symbol in the I component and the same in the Q component.

Let the M message bits be $m_1, m_2, \ldots, m_M$. A hash function is used to iteratively create a series of values called the "spine:" $s_0 = 0$, and $s_i = h(s_{i-1}, m_i)$. A function h was chosen such that each value in the spine is $n_s$ bits long, and so that the chance of two different message prefixes of length M' to have the same value $s_{M'}$ is very small. The techniques described herein use the spine to generate coded bits.

The techniques herein go over the spine in passes, producing symbols. It is possible to either generate the spine once, or re-generate it again for each pass. Each pass has its own unique function from spine values to code-bits $H_i(s): 2^{n_s} \to 2^C$. $H_i$ should have the property that for $s \neq s' \cdot \mathbb{E} H_i(s) - H_i(s'))$ is high. Symbols produced by the pass are $H_i(s_1) \cdot H_i(s_2) \ldots H_i(s_M)$. More passes provide more information for the decoder. For lower SNR values, more passes enable the decoder to overcome the channel noise.

Also, when constructing the message, the encoder divides the message bits into blocks of k non overlapping bits each: $b_i = (m_{ki+1} \ldots m_{ki+k})$. From these blocks, the encoder forms the spine from blocks rather than individual bits: $s_0 = 0$, and $s_i = h(s_{i-1}, b_i)$. If the message was M bits long, there are now M/k values in the spine. This can reduce the number of applications of h, at the potential cost of more computation when decoding (depending on the puncturing schedule, described herein).

Figure 3B:
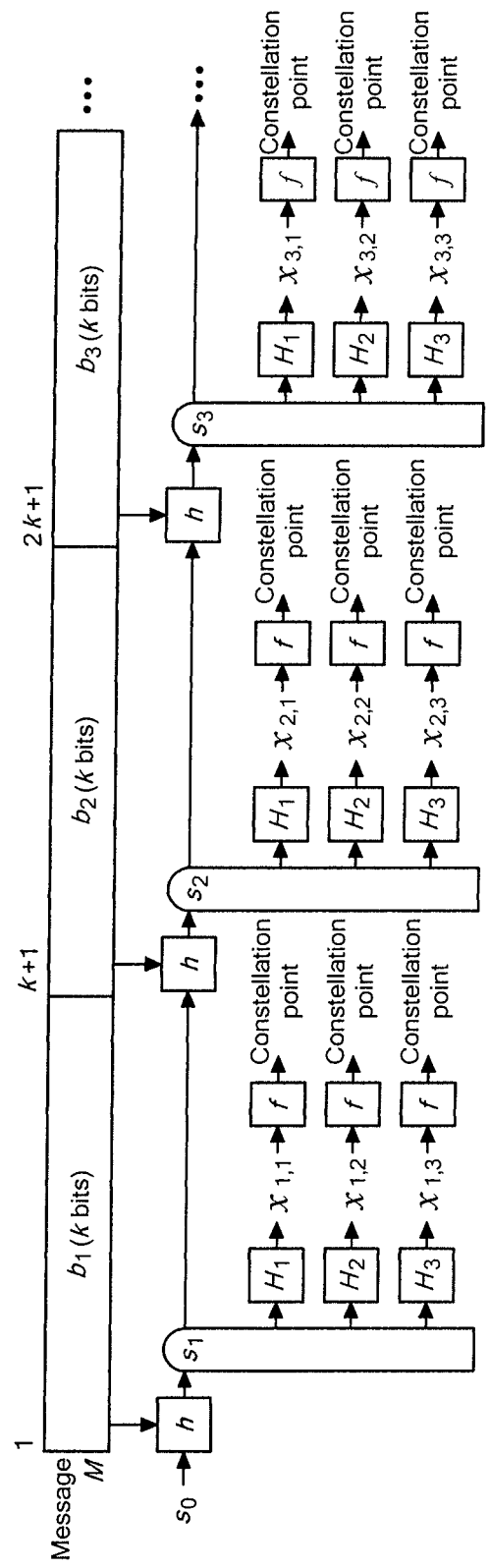

FIG. 3B shows how symbols are produced. A message, M, is divided into blocks of k bits, signified as $b_1, b_2, b_3, \ldots$. Beginning with $s_0$ the hash function, h, is applied iteratively to produce the spine $s_1, s_2, s_3, \ldots$. Coded bits are produced from spine values by applying the appropriate $H_i$ function to the spine value, denoted by $x_{i,j}$. Coded bits are transformed into constellation points by the constellation mapping f.

Figure 4A:
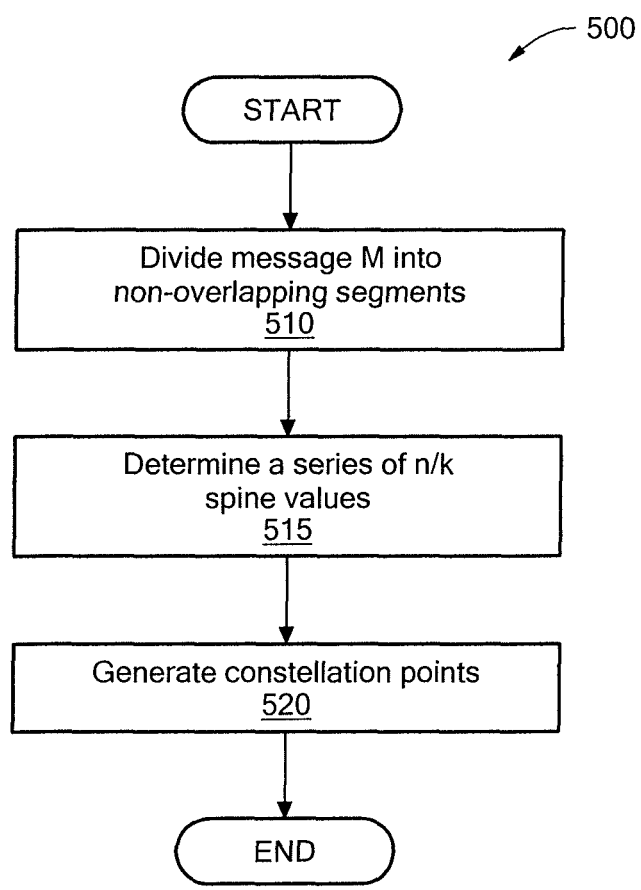
FIG. 4A is a flowchart of an example of a process to perform spine generation and encoding passes.

Referring to FIG. 4A, an example of a process for spine generation and encoding passes is a process 500. The encoder 232' takes a message block $M = m_1, \ldots, m_n$ as input and generates a possibly infinite stream of constellation points or symbols, where n is an integer greater than zero. To do so, the encoder 232' makes passes over the spine of the code, which is generated in the first pass. In particular, for the first pass, the process 500 divides the message M into non-overlapping segments of size k bits each where k is an integer greater than zero (510). Thus, $M = M_1, M_2, \ldots, M_{n/k}$ with $M_t = m_{tk+1} m_{t+2} \ldots, m_{(t+1)k} \in \{0,1\}^k$ for $1 \leq t \leq n/k$. Process 500 determines a series of n/k spine values, where: $s_t = h(s_{t-1}, M_t)$, with $s_0 = 0$ (515).

Process 500 generates constellation points by making one or more passes over each spine value (520). For example, in each pass, the encoder 232' generates n/k new constellation points. In the $l^{th}$ pass ($l \geq 1$), encoder generates the $t^{th}$ constellation point as follows ($1 \leq t \leq n/k$):

1. Let the infinite precision bit representation of $s_t$ be $b_1 b_2 b_3 \ldots$.
2. Let $b'_1, \ldots, b'_{2C}$ denote the 2C bits in the representation of $s_t$ starting from position $2C(l-1)$: for $l=1$, it is $b_1, \ldots, b_{2C}$; for $l=2$, it is $b_{2C+1}, \ldots, b_{4C}$ and in general it is $b_{2C(l-1)+1}, \ldots b_{2Cl}$.
3. Use the constellation mapping function, $f$, to map $b'_1, \ldots, b'_{2C}$ to a constellation point.

This constellation point is transmitted over the transmission link. This corresponds to an example where $H_i$ returns bits $i2C+1, \ldots (i+2)2C$ of the spine value.

In another example for process block 520, let g(s,r) be a hash function whose inputs are a spine value s and a salt r. In order to generate n/k new constellation points in pass i, coded bits are obtained by evaluating g(s, i). Then the constellation mapping function $f$ is used. In this example, $H_i(s) = g(s,i)$.

Illustratively, there are many possible constellation mappings. In one example of a linear mapping, 2C bits are taken and the first C bits are considered as the I part and the last C bits as the Q part. The I (resp. Q) coordinate mapped to the range $[-P^*, P^*]$ is:

$$(b'_1 \ldots b'_C) \to (-1)^{b'_1} \frac{(b'_2 \ldots b'_C)}{2^{C-1} - 1} \cdot P^* \quad (3)$$

In other words, a symbol $x \in \{0, \ldots, 2^C - 1\}$ linearly onto $(-P, P)$ where P is a constant derived from the power constraint. This is the value of either the I or Q axis. The formula is a linear mapping $$x \to \left(x \frac{1}{2^C - 1} - \frac{1}{2}\right) \cdot P.$$

Notably, the encoder described above generates $t^{th}$ constellation point/symbol in the $l^{th}$ pass by taking 2C bits of the spine value $s_t$, distinct from those used to generate any other constellation point. Since the spine value may be generated by a hash function, from property (i) of the hash function each non-overlapping sequence of 2C bits is equivalent to a distinct hash function that produces a 2C-bit number. Therefore, an illustrative abstraction for the encoder 232 is as follows. First, the encoder generates n/k spine values $s_t$, $1 \leq t \leq n/k$ using a hash function h. In the $l^{th}$ pass, it uses a distinct hash function $h_l: (0,1) \to \{0,\}^{2C}$ to generate constellation points. Specifically, the encoder generates the $t^{th}$ constellation point in the $l^{th}$ pass by applying constellation map to the 2C bits produced as a result of $h_l(s_t)$.

2.2 Properties of the Encoding

In the embodiment described above, the receiver obtains symbols corresponding to an integral number of passes. In this case, the achievable rates are $R_{max}, R_{max}/2, R_{max}/3, \ldots R_{max}/l, \ldots$, a harmonic sequence.

In fact, other rates are achievable using the classic idea of puncturing. In particular, each pass provides a stronger opportunity for the decoder to overcome noise. However, this process can be wasteful if the pass is very long, since only a little information might have been missing, and the pass provides an excess of information. Therefore, we can puncture the passes to get better granularity of handling noise.

In the spinal code context, an illustrative puncturing may occur as follows. In the first pass, the sender transmits a symbol for every value in the spine sequence. In any subsequent pass, the sender can choose to transmit only every $g^{th}$ value, where g may change from pass to pass. For example, one option is to use the schedule (8,4,2,1). That is, the first punctured pass sends every $8^{th}$ value, the second pass sends every $4^{th}$ value but only if it is not a multiple of 8, the third pass sends every second value but only if it is not a multiple of 4, the fourth pass sends every value but only if it is not a multiple of 2, repeating this cycle as long as necessary. The rates are now more continuous than the harmonic progression of the non-punctured schedule; they work out to $R_{max}$, $8/9\ R_{max}$, $8/10\ R_{max}$, $8/12\ R_{max}$, $R_{max}/2$, .... According to one or more embodiments herein, therefore, this puncturing schedule may be used to achieve finer-grained control over the achievable rates.

Figure 4B:
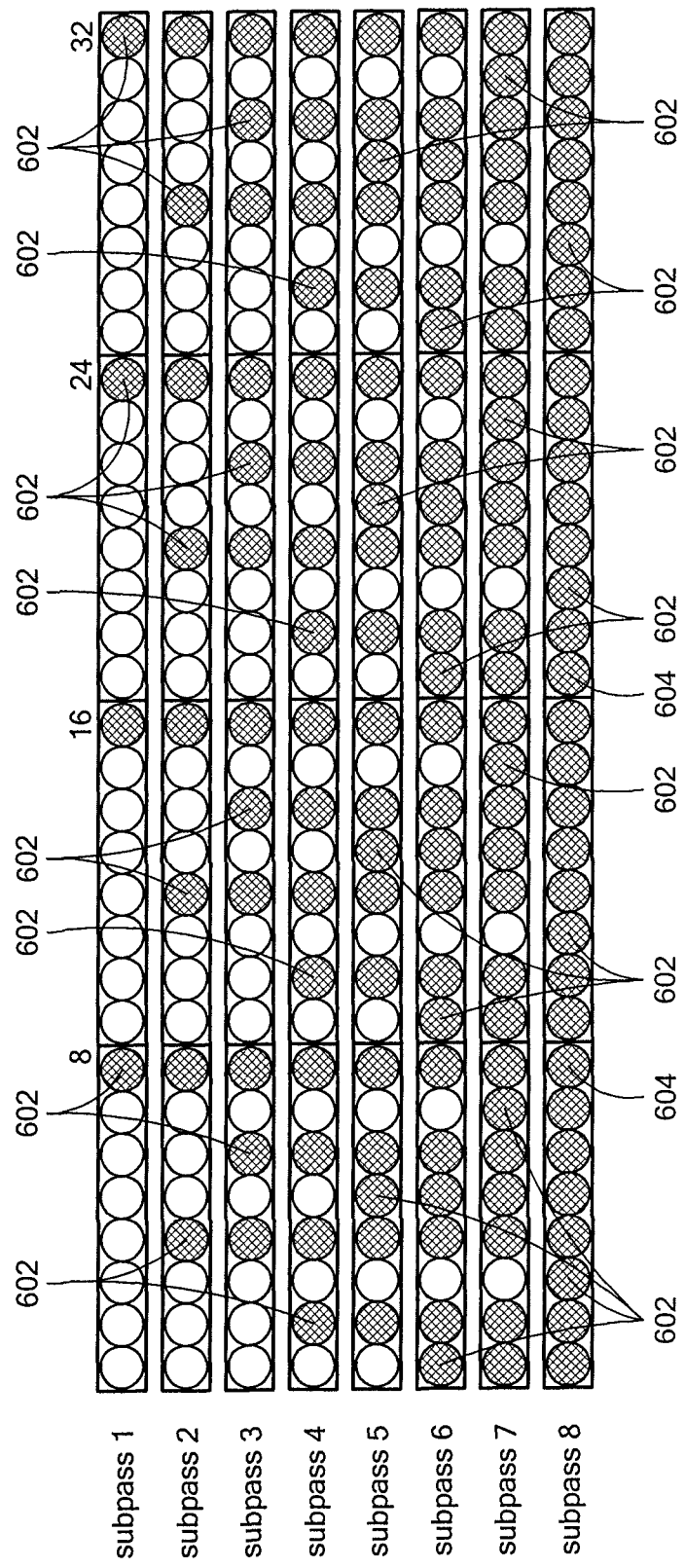
FIG. 4B is a diagram of puncturing.

FIG. 4B shows, for each pass, the spine values 602 from which symbols are to be transmitted in that pass, and the symbols 604 transmitted in previous passes. After all eight specified puncturing passes have been sent, the puncturing schedule is repeated again and again to puncture subsequent symbols.

As an additional illustrative property of the encoding, unlike most existing practical codes such as convolutional, turbo, Raptor, etc., spinal codes are nonlinear. That is, the coded bits (or modulated symbols) are not obtained as linear combinations of input message bits. Instead, they are produced by repeatedly applying a hash function over the input message bits.

The nonlinearity induced by hash functions has significant advantages. To achieve better error correcting capability, coded bit strings corresponding to different messages should be as far from each other as possible. To achieve such a property, it is important to have an encoding in which any change in message bits leads to large changes in the coded bits (e.g., symbols).

When the code is linear, to induce large changes in the coded bits by changing only few message bits, it is important to have long enough constraint length in the context of convolution like codes or more generally non-trivial expander like graph structure used in Turbo codes or sparse random graph based LDPC codes.

Non-linearity creates such large changes in the coded sequence by changing only a few bits without requiring a long constraint length or requiring the use of complicated graph structures—effectively, hash functions achieve exactly this goal. However, one should note that non-linearity is not a requirement of spinal codes.

Subsequently, the state in the trellis-based decoding remains bounded unlike convolution code where it grows exponentially with constraint length or Turbo code where entire coding graph structure is utilized.

2.3 AWGN Channel, Maximum Likelihood Decoder

In an illustrative embodiment, the standard AWGN channel model is considered for the purpose of design and analysis of the decoder. Specifically, the transmitter wishes to transmit a given message $M=m_1 \ldots m_n$. Suppose that as part of the rateless design, the transmitter has made L passes over its message to send a total of $N=Ln/k$ symbols. Denote by the $t^{th}$ symbol sent in the lth pass as $x_{t,l}(M)$, $1 \leq t \leq n/k$, $1 \leq l \leq L$. The corresponding received signal is $y_{t,l}=x_{t,l}+w_{t,l}$, with $w_{t,l}$ being the effect of noise and interference that distorts the transmitted signals. $w_{t,l}$ is independent and identically distributed (i.i.d.) over indices t,l and distributed as a complex symmetric Gaussian of mean 0 and variance $\sigma^2$. That is, for each $w_{t,l}$ the I and Q components are distributed as per Gaussian with mean 0 and variance $\sigma^2$ and independent of everything else.

At the end of the $L^{th}$ pass, the receiver, given observations $\bar{y}=(y_{t,l},\ 1 \leq t \leq n/k,\ 1 \leq l \leq L)$, wishes to estimate $M \in \{0,1\}^n$ by estimating the corresponding transmitted symbols $\bar{x}=(x_{t,l}(M),\ 1 \leq t \leq n/k,\ 1 \leq l \leq L)$.

A priori, each of the $2^n$ messages is equally likely. Given this, the maximum likelihood (ML) rule minimizes the probability of error. The ML rule estimates message $\hat{M}$ as follows:

$$\hat{M} \in \arg\max_{M' \in \{0,1\}^n} \mathbb{P}(\bar{x}(M') \mid \bar{y}) \qquad (4)$$
$$= \arg\max_{M' \in \{0,1\}^n} \mathbb{P}(\bar{y} \mid \bar{x}(M'))$$
$$= \arg\max_{M' \in \{0,1\}^n} \exp\left(-\frac{1}{2\sigma^2} \sum_{t,l} \|y_{t,l} - x_{t,l}(M')\|^2\right)$$
$$= \arg\min_{M' \in \{0,1\}^n} \|\bar{y} - \bar{x}(M')\|.$$

In summary, given the received vector of signal $\bar{y}$, the optimal ML decoder estimates the transmitted message $\hat{M} \in \{0,1\}^n$ as the one where transmitted encoded vector, $\bar{x}(\hat{M})$, is closest (in $l_2$ distance) to $\bar{y}$.

As the number of passes L increases, the received information increases and the bit error rate should decrease. Now, if the decoder takes L passes to decode, then the effective rate as discussed earlier is $R_{max}/L$. It is well known that no coding scheme (rateless or rated) can achieve zero bit error rate unless the rate is smaller than the Shannon capacity. In Section 2.4, it is shown that in the encoding scheme herein, the smallest L for which $R_{max}/L$ becomes smaller than capacity, the decoder manages to decode with (asymptotic) bit error rate equal to zero. That is, the performance of the rateless code described herein is about as optimal as theoretically possible.

To establish the result, one example embodiment uses a decoder that is "weaker" than ML: it is a minor modification of the minimum distance decoder and can be thought of as a sphere or list decoder. Note that since the result is established under this weaker-than-ML decoder, it implies the result for the ML decoder as well.

Both the ML decoder and the weaker decoder used to establish proof are computationally intensive as they require searching for code words that are closest to a received signal among all $2^n$ code words. Using the structure of the sequential spine construction herein, in principle all these $2^n$ messages can be enumerated in a sequential manner. However, by utilizing the soft-information in this sequential enumeration, it is shown in Section 2.5 how it is possible to truncate the search to a much more manageable space.

2.4 Near-Optimality of Spinal Codes

Without loss of generality, the techniques herein consider a spinal code encoder that generates symbols in one dimension rather than over the two dimensional I-Q plane. Because each dimension is independent, the capacity of the 2D version, measured in bits/symbol, is simply double the capacity of the 1D version.

Due to the randomness of the hash function, each symbol $x_{t,l}$ is distributed uniformly in $[-P^*, P^*]$. Hence the average power per symbol is $(P^*)^2/3$. The capacity of the AWGN channel with average power constraint P per symbols is given by $C_{awgn}(P)$, where $$C_{awgn}(P) = \tfrac{1}{2}\log_2(1+\text{SNR}) \text{ bits/symbol}, \quad (5)$$

where $\text{SNR}=P/\sigma^2$ denotes the signal to noise ratio. It is shown below that essentially the receiver herein can correctly decode the smallest L for which $R_{max}/L$ is less than $C_{awgn}(P)$ using a decoder weaker than ML. That will establish that our rateless code is as good as possible (including the rated codes).

Now consider the smallest such L, let the hash functions used by the encoder in the $l^{th}$ pass be $h_l:(0,1) \to \{0,1\}^{2C}$ for $1 \leq l \leq L$. Recall that in the $l^{th}$ pass, the constellation points $x_{t,l}$ were generated as: $x_{t,l} = f(h_l(s_t))$ with $s_t = h(s_{t-1}, M_t)$ and $s_0 = 0$.

The weaker decoder considered herein is a minor modification of ML. From Equation (4), the ML decoder estimates the transmitted message as $\hat{M}$ whose $\bar{x}(M)$ minimizes $\|\bar{y} - \bar{x}(M)\|$. Instead, we consider the message that minimizes $\|\alpha \bar{y} - \bar{x}(M)\|$ with $\alpha = P/(P+\sigma^2)$. This minor modification makes analysis simpler (though the decoding property is weaker than ML). The techniques herein use a sphere or list decoding variant based on this modification. Specifically, given received $\bar{y}$, declare any message that belongs to the list $S_\delta(\bar{y})$ as the decoded message, where $$S_\delta(\bar{y}) = \left\{ M' \in \{0,1\}^n : \|\alpha\bar{y} - \bar{x}(M')\|^2 \leq \frac{(1+\delta)NP}{1+\text{SNR}} \right\}. \quad (6)$$

for a very small $\delta > 0$, breaking ties arbitrarily.

Figure 5:
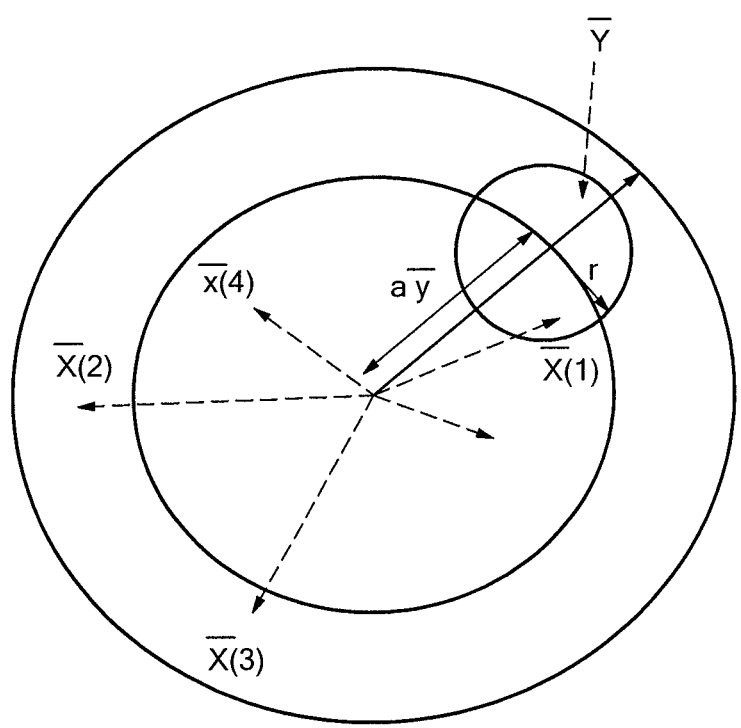
FIG. 5 is a diagram depicting an example of a sphere decoder.

FIG. 5 provides a pictorial description of this decoding process. The bit error rate (BER) of the decoder is the fraction of bits decoded incorrectly, i.e.

$$\text{BER} = \tfrac{1}{n}(\text{number of bits in } M \text{ not equal to } \hat{M}). \quad (7)$$

In particular, FIG. 5 illustrates a sphere decoder where the received signal $\bar{y}$ is scaled down by $\alpha=P/(P+\sigma^2)$; message $\bar{x}(1)$ lies within $$r \approx \sqrt{\frac{NP}{1+\text{SNR}}}$$

of it and hence is decoded at the transmitted message.

As a result, the near-optimality of the rateless spinal code may be summarized in the following theorem.

THEOREM 1. For any number of passes L such that $$\frac{R_{max}}{L} < C_{awgn}(P) - \tfrac{1}{2}\log\!\left(\tfrac{\pi e}{6}\right)$$

the BER goes to 0 as n goes to infinity.

The above result states that in the rateless setting herein, the decoder can start decoding correctly (BER≈0), as long as the number of passes made by the encoder is just sufficient enough. That is, with puncturing the effective capacity is $$C_{awgn}(P) - \tfrac{1}{2}\log\!\left(\tfrac{\pi e}{6}\right).$$

This is smaller by a constant $$\Delta \equiv \tfrac{1}{2}\log\!\left(\tfrac{\pi e}{6}\right) \approx 0.25$$

for all SNR values compared to the capacity established by Shannon (for rated codes). $\Delta$ is a small fraction of the capacity for large SNR. For example, for SNR=30 dB, the capacity in 2D is roughly 10 bits/s/Hz and hence the code herein may achieve approximately 98.5% of the Shannon capacity. (Note that this is only theoretical guarantee; this loss is in part inherent and in part a limitation of the proof. For example, at low SNR, much higher rates are achieved in practice than predicted by the above result. Further, the result is stronger than what is stated above because for any value of n when BER is not strictly 0, the erroneous bits are always in the last few bits, a property that is used in the practical decoder herein.

2.5 A Practical Tree Decoder for Spinal Codes

A naive implementation of an ML decoder would require an exhaustive search over the space of all $2^n$ possibilities. In this section a practical parametric scheme is described, which crucially utilizes the structure of the encoder, to implement such a search. As the value of the decoder's parameter increases, the decoding complexity increases as well, but the communication rate converges to that of the exact ML decoder. Note that for even small values of the parameter, the rate achieved by this scheme is nearly as good as with an exact ML decoder, with much lower decoding complexity.

Figure 6:
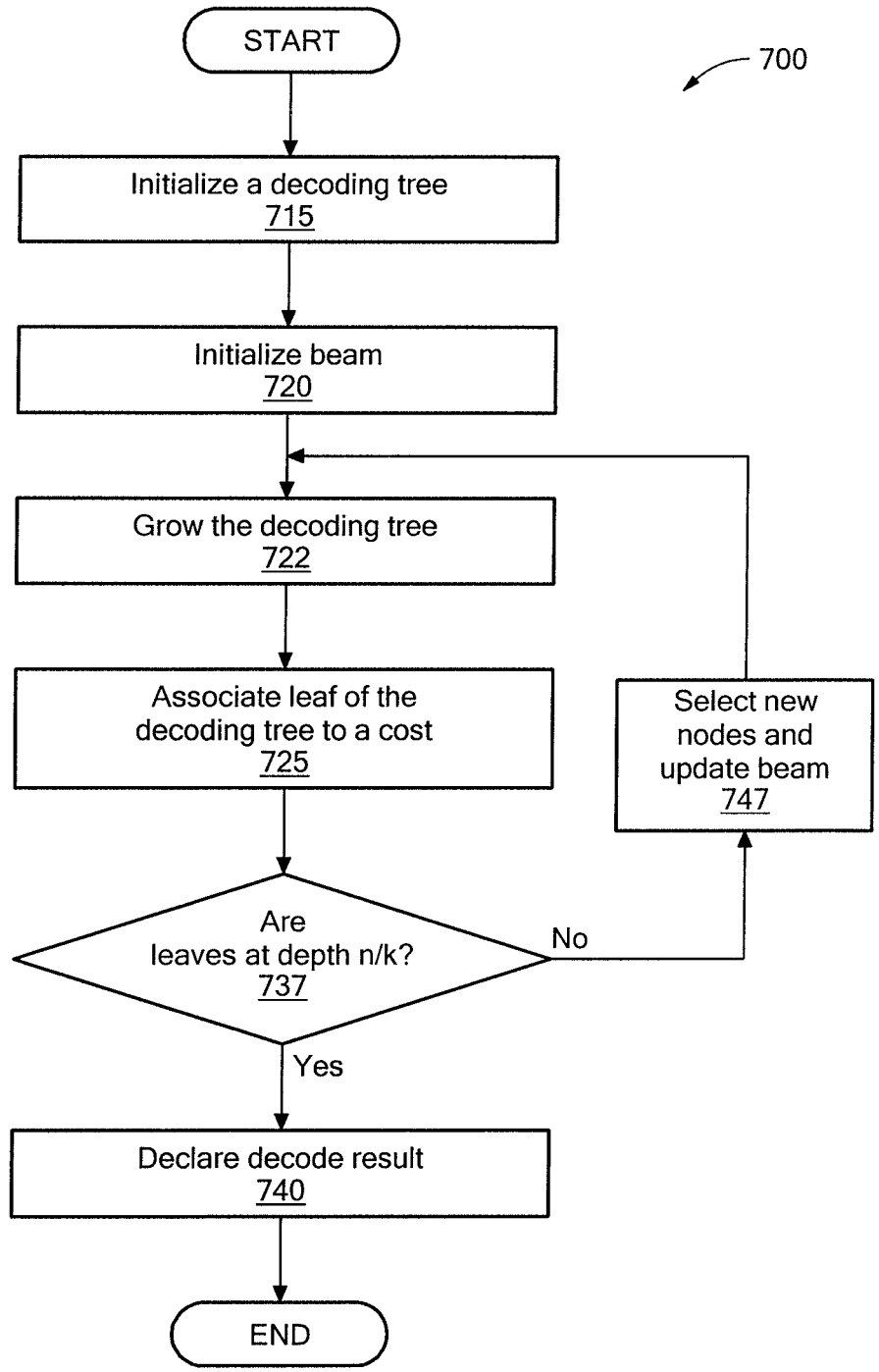
FIG. 6 is a flowchart of an example of a process to decode.

Referring to FIG. 6, an example of a process to decode is a process 700. In one example, the process 700 is used by the decoder to operate in a rateless manner, for example, by implementing a process 330 inside a system 300 given in FIG. 2. Process 700 starts with received constellation points corresponding to the symbols generated by the encoder in its first pass over the spine. Using the same notation as before, let the received symbol in the first pass generated from the $t^{th}$ spine values be $y_{t,1}$ for $1 \leq t \leq n/k$. Process 700 starts generating a decoding tree starting from $s_0$ as the root of the tree (715). For example, the decoder knows that the initial spine state $s_0=0$. In the decoding tree, each node at depth d corresponds to a prefix of length kd bits, and is labeled with the final spine value $s_d$ of that prefix. Every node has $2^k$ possible children, representing a choice of k message bits.

Process 700 keeps a list of nodes that will be expanded, called the beam. The beam is initialized to contain the root of the tree $s_0$ (720).

Now, the decoder proceeds to iteratively grow the tree, associate costs to leaves, and update the beam, until the leaves are at depth n/k. To grow the tree, each node in the beam is expanded to have a full subtree of depth d, where d is a parameter of the code. By full it is meant that every internal node has $2^k$ children, corresponding to all possible k-bit combinations of message bits. In the first iteration, the spine value $s_1$ could be one of $2^k$ possibilities: $h(s_0, M_1)$ for each $M_1 \in \{0,1\}^k$. The decoder generates $2^k$ children (nodes) of the root and associates to each of them a distinct spine value from these $2^k$ values. These children are each expanded with their $2^k$ children and so on until d layers (or generations in the children analogy) have been expanded. In other iterations, every node in the beam has d generations expanded in the tree (722).

Let $x_{t,1}(s_t)$ be the associated constellation points that the encoder would have generated (using $f$) to transmit this spine value, $s_t$. To each edge in the tree leading into a specific node $s_t$ process 700 associates a cost, termed the branch cost, equal to $\|y_{t,1}-x_{t,1}(s_t)\|^2$. Each leaf of the decoding tree is then associated with a cost, termed the path cost, which is the sum of branch costs of all edges on the path from the root to the leaf (725).

Process 700 now checks if the leaves in the tree are at depth n/k (737). If this condition is false, process 700 proceeds to select a new list of nodes and updates the beam (747), and continues iterating. The choice of new nodes for the beam proceeds as follows. As candidates for the new beam, all the children of the nodes in the beam are considered. A children u is associated with a score z(u) which is the minimum path cost of all leaves hanging under u. The next beam is selected to be the B nodes with lowest scores, breaking ties arbitrarily (if there are less than B candidates, all of them are taken as the beam).

Figure 7A:
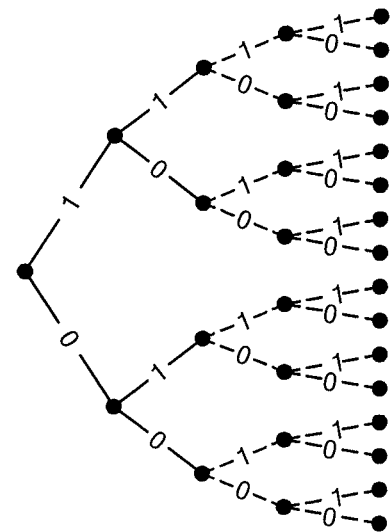
FIG. 7A is a diagram of an example of a decoding tree.

FIG. 7A shows an example of such decoding tree for k=1, d=1, B=1000 and n=4.

Now consider one of these leaf nodes. There is a unique path that connects the root to this leaf node and this path associates it to a distinct message in $\{0,1\}^n$. Consider a particular leaf node and let the path from root to this leaf node contain n/k nodes that correspond to $M_1, \ldots, M_{n/k}$ in the above construction. Then, this leaf node corresponds to the message $M=M_1, \ldots, M_{n/k} \in \{0,1\}^n$. The path cost of this message is the sum of the branch costs associated with edges of this path. That is, the path cost of M is $\Sigma\|y_{t,1}-x_{t,1}(s_t)\|^2$.

Returning to FIG. 6, once process 700 obtains path costs for leaves at depth n/k, it returns the result of the decoding (740). For example, the decoder at the end of the first pass would decode the transmitted message as the one that has the smallest cost. As one of ordinary skill in the art should recognize, this is the minimum distance decoder, and from Equation (4), it is an approximation of the ML decoder for an AWGN channel.

Another example of return value is returning all possible messages corresponding to leaves under the beam nodes. In that case, the decoder is a "list decoder".

Another example of return value is returning the path cost alongside decoded messages, giving the decoder some measure of certainty as to the accuracy of the result. This would make the decoder a "soft output" decoder.

The discussion above shows a decoding example when there is exactly one unpunctured pass. When process 700 is presented as input with multiple passes (or a subset of multiple passes due to puncturing), the process remains similar, although the computation of branch costs changes. Upon receiving as input the $t^{th}$ symbol in the $l^{th}$ pass, $y_{t,l}$, the decoder adds the appropriate costs to the edges in the $t^{th}$ level of the tree at the time of computation (725). Specifically, consider a node in the $t^{th}$ level of the tree and let $x_{t,l}(s_t)$ be the associate symbol that encoder would have transmitted in the $l^{th}$ pass (this is merely the function of the associated spine value $s_t$ and can be produced easily given that each node has associated spine value stored during the construction of the tree). Then increment the branch cost of the edge pointing into $s_t$ by $\|y_{t,l}-x_{t,l}(s_t)\|^2$. Put differently, the branch cost of an edge that goes into a node $s_t$ is computed using all symbols $y_{t,l}$ (for l=1, 2, ...) that are available: it is $\Sigma\|y_{t,l}-x_{t,l}(s_t)\|^2$, where the sum is over all l's for which $y_{t,l}$ has been received. As before, at any time the path cost of a message is the sum of the branch costs of the edges that lie on the path that connects the root to the leaf node corresponding to the message. And the decoding decision of estimating message as the one with minimum cost is the exact ML estimation.

As the system (for example process 300 in FIG. 2) receives more and more symbols, there is a change in the cost of messages and hence possibly in the estimated minimum cost message. That is, as more information is received, the cost of the actual message becomes smaller (relatively) compared to the other messages. After enough symbols have been received, the actual transmitted message has very small cost, and the decoder is able to recover it successfully.

The implementation of process 700 uses a property where probabilistically it can be expected that most messages will have a much higher cost compared to the message with maximum-likelihood. This suggests that it is reasonable to maintain information about a small number of messages that are likely to have smaller overall cost at each level of the tree (i.e., a small B and d). A simple greedy heuristic, which at each stage of the decoding tree maintains only a small number of nodes, enables a practical decoder to be built for spinal codes.

Put another way, let B be the number of nodes that are maintained in the beam at each iteration. One step of the recursive construction of the pruned version of the above described tree is as follows. Suppose the decoder is receiving symbols from the transmitter in the $l^{th}$ pass, l≥1 and suppose it has received thus far t−1 symbols in that pass. Using this information, suppose it has recursively constructed tree up to at least depth t−1 with at most B unpruned nodes at each level. For nodes at depth t−1, it has stored the corresponding spine values, the branch cost of the edge incoming to the node, and the path cost of that node (the path cost is the sum of the branch costs of the edges on the path joining this node to the root).

To generate up to B nodes at depth t (the beam at depth t), the decoder first generates the subtree of $2^{kd}$ offspring of each of the (at most) B nodes at level t−1. Therefore, there are a total of at most $B \cdot 2^{kd}$ such nodes. Now suppose the decoder has received, for each pass up to pass l, the symbols generated from spine values $s_t, s_{t+1}, \ldots s_{t+d-1}$, i.e., $y_{t',l'}$ for all l'≤l, for t≤t'<t+d. Associate a branch cost to each of the edges in the subtree (particulars are described above), where $x_{t,l}(s_t)$ is the constellation point that encoder would have generated using the spine $s_t$ of that particular node. The total cost of the node is this cost plus the total cost of its parent at level t−1.

Choosing just B nodes with the smallest costs and pruning others maintains the state in the decoder bounded, unlike in trellis decoding of a convolution code where the amount of state grows exponentially with constraint length or similarly Turbo codes with decoding over a trellis.

Returning to FIG. 6, Process 700 selects at most B of these nodes with the smallest possible total costs z(u) to retain at level t (745). Thus, at each level using all the received information in a greedy manner the truncated tree is created. The decoder estimates the transmitted message as the one that has minimum total path cost among the $B2^{kd}$ messages corresponding to the leaf nodes at the level n/k of this pruned tree.

Figure 7B:
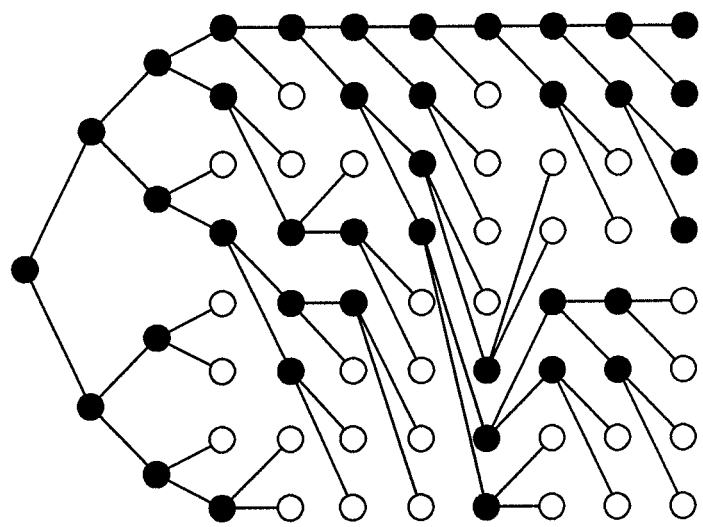
FIG. 7B is a diagram of an example of a pruned decoding tree.

FIG. 7B provides an example of such pruned tree with k=1, n=10 and B=8, d=1. Note that such a pruned search over a tree of nodes (with d=1) is known as beam search to those skilled in Artificial Intelligence (especially speech recognition), or M-algorithm, to those skilled in Information Theory (especially sequential decoding). In keeping with the Artificial Intelligence terminology, the term "beam width" refers to B, the number of pruned tree nodes maintained at each level. Note however the algorithm parameterized with d, is not beam search, but is rather a more general, novel construction. Beam search is a special case of this decoder when d=1.

Essentially, the encoder 232' (e.g., as shown in FIG. 3B) is a structure used to generate the spine (s values) and some symbols (x values), where the functions used to generate the spine values and symbols can be non-linear or linear. The main idea behind this structure is that it is incremental—the number of possible values of M that can go into g is limited. This allows the decoder to efficiently "replay" the encoder.

This notion of replay is captured in the tree described in the decoder. Having a small number of possible $M_t$ values at each level allows for relatively "cheap" expanding of a node of the tree. This low cost of expanding a node in the tree can be leveraged by a search heuristic, which chooses which nodes to expand. Specifically, as described above, a beam sort with constant beam width B may be used, i.e., choosing only the best B nodes to expand at each layer. However, many heuristics can be used when searching the tree, such as Beam Search Using Limited Discrepancy Backtracking (as will be understood by those skilled in the art), as well as various other alternatives with or without heuristics.

An advantage of the techniques herein is that the space of spine values (s) is relatively large ("large s-space"). This would mean that in most cases, two different nodes in the same layer do not have the same spine value, which is distinguished from existing methods that have a spinal-code structure, which have a small s-space (e.g., Binary Convolutional Codes, or "BCC").

2.6 Performance

Simulation results using the practical spinal code decoder over an AWGN channel is now presented and the performance of the code is compared with the Shannon capacity for various parameters of the code and how the code's ability to withstand noise depends on the number of bits in the message block. This will influence the design of the rateless protocol.

Figure 8A:
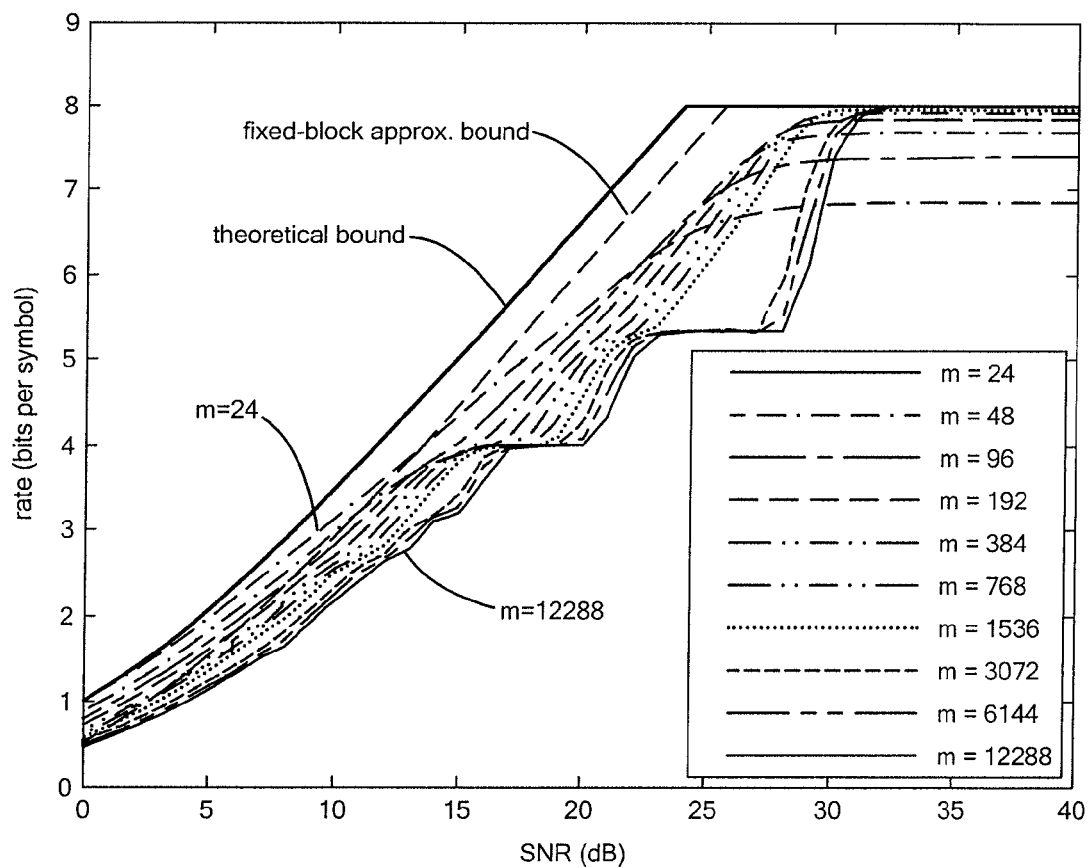
FIG. 8A is a graph depicting a rate achieved by the practical decoder with a beam size of 16.

FIG. 8A shows the rate achieved by the unpunctured spinal code as a function of SNR for different block sizes "m". The beam width is 16 and $k(=R_{max})=8$. The "theoretical bound" is given by the Shannon capacity, $\log_2(1+SNR)$, but is shown as a flat line when it reaches $R_{max}=8$ bits/symbol. To measure the performance of the spinal code, it is assumed that the receiver informs the sender as soon as it is able to fully decode the data. The x-axis shows the SNR (dB), and the y-axis shows the rate achieved in bits/symbol. The different curves are for different block sizes, i.e., each curve is the result of encoding and decoding blocks of a specific number of bits, ranging from 24 bits to 12288 bits. The curve also shows the theoretical maximum Shannon capacity.

Note that smaller block sizes produce higher rates than larger ones. A possible explanation is that with a fixed beam width, there is some probability at any stage in the decoding during a pass that the correct state is not in the set of states maintained in the decoder. When that happens, the message block cannot be decoded in this pass, and the sender has to send at least one more pass. Assume that the probability is $\Delta$; the probability that an n-bit block has from this problem of the correct state not being within the beam width is $\approx n\Delta$, which increases with n. As a result, larger chunk sizes perform worse.

On the right side of this chart, as SNR increases, the curves start to cross over and larger block sizes outperform smaller ones. The reason is that, for any code, smaller coded block sizes have inherent fundamental limits on the capacity they can achieve; this capacity increases with the size of the coded block.

Figure 8B:
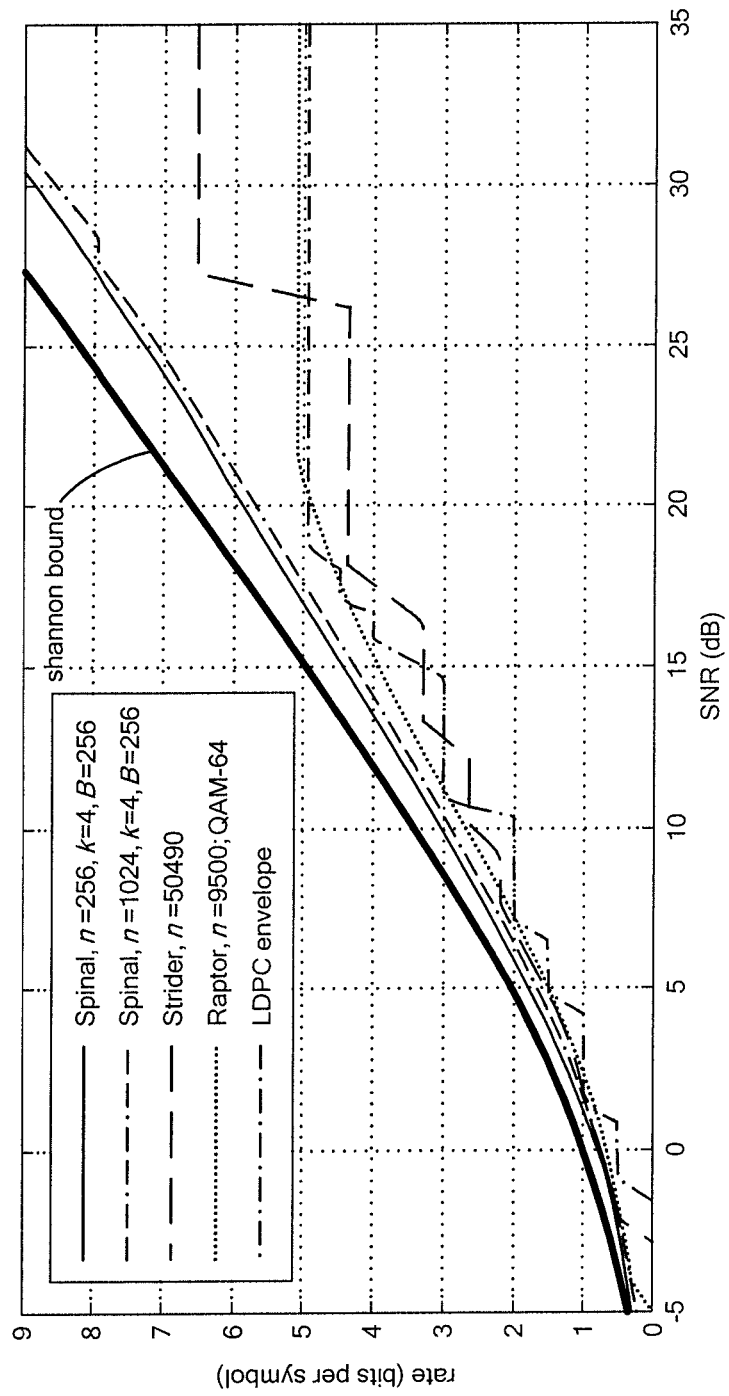
FIG. 8B is a graph depicting performance of spinal codes with parameters B=256, k=4, 1-D symbols (producing either the I or Q values), d=1, puncturing, and message lengths 256 and 1024.

FIG. 8B depicts the performance of spinal codes with parameters B=256, k=4, 1-D symbols (producing either the I or Q values), d=1, puncturing, and message lengths 256 and 1024, when compared with other codes: LDPC, Strider and Raptor.

An appropriate choice of coded block size is one that achieves a high enough rate over the typical SNR range, but the smaller the block size, the higher the overhead. There are two sources of overhead: a cyclic redundancy check (CRC) or a similar mechanism for determining if the block has been correctly decoded, and the trailing pad symbols, used to make the true message stand out among all other possible messages in the beam. From the figures presented, a preferred embodiment uses a block size of 1024 bits. As will be seen in the next section, a network-layer packet gets divided into independently coded blocks of that size and transmitted using the rateless link protocol.

3. Rateless Link Protocol

Figure 9:
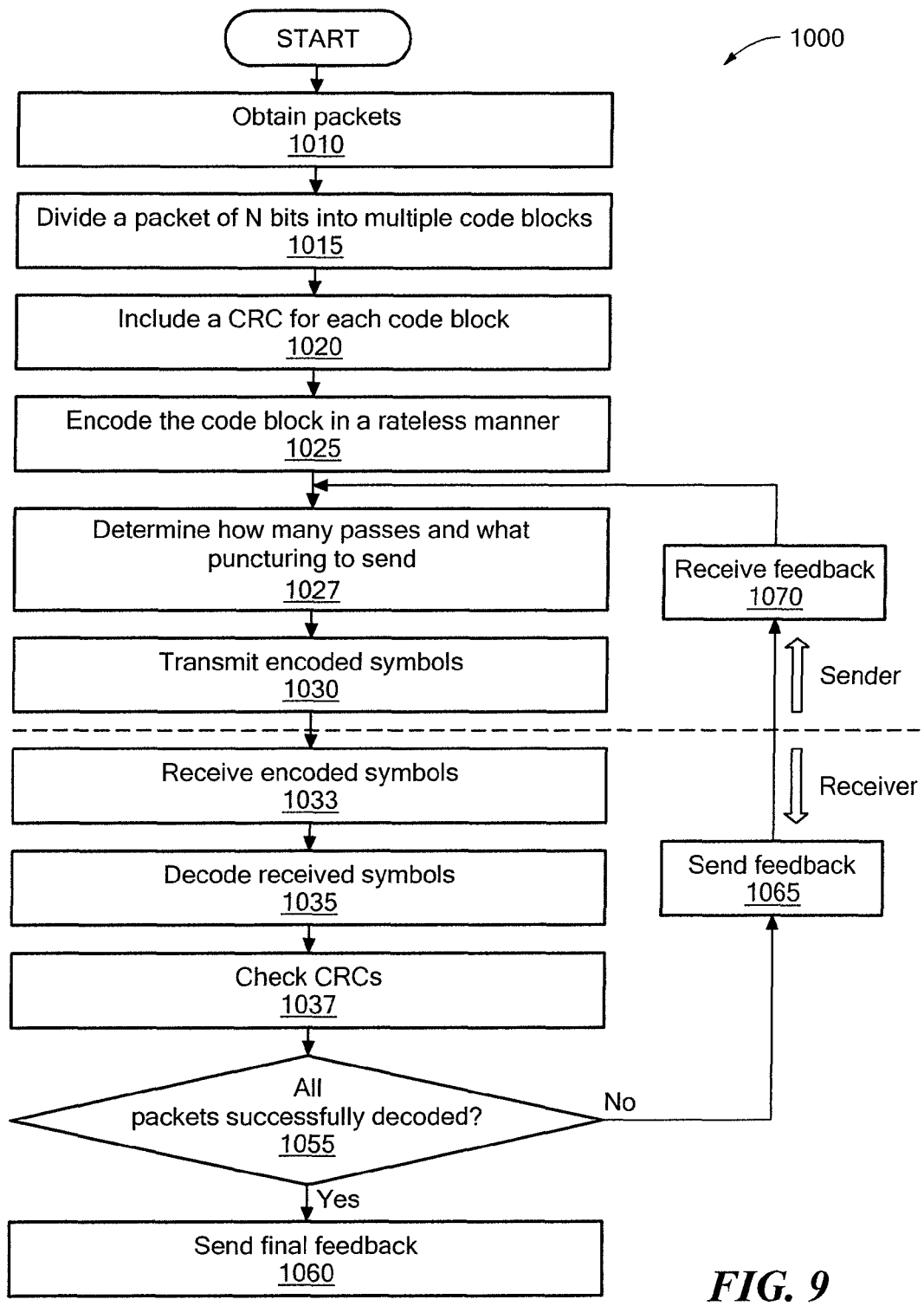
FIG. 9 is a flowchart of an example of a process to use a rateless link protocol (RLP)

Referring to FIG. 9, an example of a process used to execute a rateless link protocol (RLP) is a process 1000. Process 1000 obtains the packets (1010). For example, a link-layer of the sender obtains packets from the network layer and processes a packet one at a time. Process 1000 divides a packet of size N bits into multiple code blocks (1015). For example, the code blocks are each n bits long. As used herein it is assumed that S=N/n is an integer.

In RLP, the granularity for error detection is a code block, and is not the entire packet. As a result, process 1000 includes a CRC for each code block (1020). For example, the sender includes a CRC for each code block at the end of the code block. Process 1000 encodes the code block in a rateless manner (1025), decides how many passes and what puncturing to use for each code block (1027), and transmits the encoded symbols (1030). For example, the sender encodes the code block along with the cyclic redundancy check (CRC), e.g., using a spinal code, in a rateless manner and transmits one pass of the encoded symbols. In one particular example, the CRC is "strong", e.g., CRC-32, whose failure probability is low (much smaller than a post-coded bit error rate).

While several codes (e.g. spinal codes, Raptor) are rateless, the ability to use them in a protocol with half-duplex radios relies on receiver feedback. In any type of rateless code design discussed in literature, one implicitly or explicitly assumes availability of continuous feedback from the receiver. In practice, feedback is not instantaneous: waiting for it results in loss of effective throughput but then knowing if decoding is done helps in wasting bandwidth. Therefore, it is crucial to understand the cost versus benefit of obtaining feedback at any instant in the design of RLP. Two important questions are: first, how many coded symbols should the sender transmit over the link before pausing to get feedback from the receiver, and second, what form should this feedback take?

For example, the sender encodes each code block of the packet using a spinal code in processing block 1025 and sends the resulting symbols in passes to processing block 1030. The receiver uses S concurrent decoders, one per code block. The sender sends symbols one pass at a time (these passes could be punctured).

The sender receives these transmitted symbols (1033) and attempts to decode the code blocks (1035). The decoded code blocks are checked if their CRC passes (1037). Eventually, when the receiver has decoded all the code blocks, it checks the packet's strong CRC, and if that matches, sends the "all 1's" feedback to the sender, which informs the sender to proceed to the next packet (1060). If it is determined that the message has not been fully received, process 1000 sends feedback to the transmitter (1065).

Process 1000 receives the feedback (1070). For example, an S-bit message, with bit i set to 1 if code block i was decoded successfully (as determined by the CRC), and set to 0 otherwise. This feedback is sent at a low rate (e.g., 1 bit/symbol), so that it is more robust to errors encountered in the feedback, similar to the way in which link-layer ACKs using IEEE standard 802.11 are sent at a low bit rate.

To make the determination in processing block 1040 after receiving feedback, RLP weighs the benefits of receiving feedback against the cost of getting it. Feedback is beneficial because it informs the sender which code blocks have already been decoded, allowing it to expend future bandwidth only on undecoded blocks in processing block 1030. The gain from feedback is that the sender can stop expending bandwidth on blocks already decoded. The gain can be represented as the fraction of symbols, p, that are in blocks already decoded (the transmitter will learn this p after receiving feedback and in practice will only have an estimate of p from recent history).

Feedback is not free in terms of not causing delays. For example, in a half-duplex communication system (as in most radios today), it takes time for the sending radio to change from sending messages to receive feedback, process that feedback, and then change from receiving feedback to resume sending. A similar delay is incurred by the receiver concurrently, and it takes some time to send even the S bits of feedback. In one example, the feedback time is modeled as one quantity, $T_f$, which is a constant. During this time, $T_f$, the protocol incurs an opportunity cost because the sender is idle. The number of useful symbols that could have been sent if the sender did not idle is equal to $$\frac{T_f}{T_{sym}}(1-p),$$

where (1−p) is the number of symbols in as-yet undecoded blocks, and $T_{sym}$ is the time to send a single symbol over the link.

One method to determine when to pause for feedback is to do so when the gain exceeds the cost, i.e., when $$p > (1-p)\frac{T_f}{T_{sym}}, \text{ or } p > \frac{T_f}{T_f + T_{sym}}.$$

In practice this number may be about 10 or so, which means that the sender should seek feedback when about 90% of the symbols have been decoded.

In accordance with the embodiments herein, the sender maintains a recent cumulative distribution function (CDF) of how many symbols (or equivalently, passes) were needed to decode code blocks, and uses this CDF to estimate the appropriate percentile (or to evaluate p at a given instance in encoding) at which to ask for feedback. In a favorable setting, these CDFs are sharp: up to some number of symbols, most blocks are not decoded and soon after transmitting few more symbols per block, almost all are decoded. This suggests that by asking for feedback for the first time when one expects 90% of the blocks decoded, the bandwidth lost in transmitting already decoded blocks is negligible. This is indeed observed in the experiments. Eventually, when the receiver has decoded all the code blocks, it checks the packet's CRC, and if that matches, sends the "all 1's" feedback to the sender, which informs the sender to proceed to the next packet.

In another example of an RLP, the sender can work in a streaming manner: when a code block is decoded successfully by the receiver, the sender can in subsequent passes encode a new code block from the stream. When that code block is decoded, a yet another new code block can take its place. This can happen for example indefinitely (this setting allows only one receiver and one transmitter) or for example until a predetermined maximum number of code blocks have been sent from the stream (and thence a different transmitter-receiver pair can occupy the wireless medium)

4. Implementation

The specification of the encoder and decoder requires a hash function h that can generate spine values, the per pass hashes, $h_l$, and C (the number of bits taken from the spine for each of the I and Q dimensions). In choosing h and C, assumptions on the hardware and channel are useful in reducing implementation cost.

C can be chosen to be a rather small value. Experimental studies with spinal codes show that a conservative C=5 may be used.

Moving from the infinite representation of spine values, spine values may be represented as 64-bit long integers in one embodiment, each mapped to a possibly infinite number of symbols. A technique described in a paper by D. Bernstein, "The Salsa20 Family of Stream Ciphers," Lecture Notes in Computer Science, 4986:84-97, 2008, (hereinafter "Salsa20") may be used as a building block for h and $h_l$. Salsa20 takes 384 bits as input, and outputs 512 bits. At each step of an illustrative embodiment herein, the previous spine $s_{t-1}$ and a block $M_t$ of k bits (totaling 64+k bits) are taken and inflated to produce a 384-bit input to Salsa20. The output bits may then be taken to create the next spine and a few symbols (for example, 51 symbols when C=10). More bits can be produced as necessary by re-applying Salsa20.

Salsa20 is only one example technique that was chosen for its relatively low computational cost. Computation consists of rounds, with each round performing 16 XORs, 16 additions and 16 rotations on words of 32-bits, making it highly efficient on general-purpose processors. Applying the function in the spinal code setting does not require cryptographic guarantees, so using fewer (e.g., 12) rounds results in better performance (Salsa20/12).

In one example, the decoder may be implemented on a GPU (Graphics Processing Unit) to exploit parallelism and to study how well spinal codes benefit from it. The beam searches at the decoder can be considered as two stages: branch and bound. In the branch stage, the algorithm produces all the spines at the next layer of the spine tree, along with their likelihoods. In the bound stage, only the spines with highest likelihoods are kept, while others are pruned. The branch step is "embarrassingly parallel"—every branch can be expanded independently of the others.

In the bound stage, it is harder to exploit parallelism on the GPU. This stage is not strictly a sorting problem, but rather an order statistic problem. The order of spine values doesn't matter as long as the best results are kept and others are pruned. Three different approaches to the bound step may be implemented. First, bitonic sorting. Second, a randomized pivot-based process for finding the order statistic. This is like quicksort, only that the relevant partition is examined and the other is ignored. Third, using a heap, maintained to keep only the best spines. Certain implementations are memory-bound. The non-parallel, heap-based computation allowed using fast memory for the heap, and was the fastest.

Advantageously, the BER of the spinal code can reach 0 at rates just lower (by a small constant) than capacity: the key insight in proving this result is the observation that the prefix is error-free and the errors are concentrated in the trailing bits. This allows the addition of a small number of trailing bits (one or two symbols) after the actual message to dramatically reduce the BER of the message itself. Also, even when the SNR is fixed and one can design the best rated code for that specific SNR, rateless operation is useful because when the channel does behave better than planned for, the rateless code does not incur the overhead of the rated one. Hence, even though the rateless system described herein combats time-varying channels, the benefits are more universal. Moreover, the ability of the decoder to work well at as small a beam width as 16 is particularly useful. 16 is small enough that the system can run at high data rates; as one comparison, hardware implementations of IEEE Standard 802.11 use 64-state trellises routinely, involving 4× more state in the decoder. The gap from the decoder means that it is able to accommodate the more complicated sorting and XOR operations required by the random nonlinear hash calculations, trading off reduced state for more computation.

While there have been shown and described illustrative embodiments for encoding and decoding a class of codes with a "spine structure" (e.g., spinal codes), it is to be understood that various other adaptations and modifications may be made within the spirit and scope of the embodiments herein. For example, the embodiments have been shown and described herein with primary relation to wireless communication. However, the embodiments in their broader sense are not as limited, and may, in fact, be used with other types of communication, such as wired communication (e.g., network communication), as well as other applications, such as storage (hard drives, solid state drives, etc.).

Also, in addition to the description above, the symbols (x) need not be a constellation point on the I-Q plane, but may be only 1 dimensional. Two 1-D symbols can be joined, one on the I axis and one on the Q axis, to form a quadrature (I-Q) symbol that is modulated and transmitted. The two symbols can be derived from different locations on the spine (i.e., be derived from $s_i$ and $s_j$ for i different than j). This allows reduction of the number of possibilities of $M_i$ while still achieving the same rate, and thus reduces the complexity of the decoder significantly. This additional facet of spinal codes can yield performance gains of x16-x1024.

Further, the techniques described above need not be restricted to other illustrative examples given above. For instance, the functions that derive symbols, $f$ need not only create uniform values between −P and P. For example, one could have the $f$ functions map into the space of single bits, creating a spinal code from bits to bits. Also, in certain embodiments, the h, $h_t$ and $f$ functions can change from step to step. Still further, deriving one or more $M_i$ values from the original message M can be done in an arbitrary manner, as long as it is possible to derive information about M back from the $M_i$ values (e.g., a "pre-coding stage" can be employed on M to produce $M_i$ values using an outer code) Lastly, while a cost function is described that is optimal for AWGN, other cost functions can be used, e.g., ones more suitable for other noise models, or heuristics to estimate such cost functions.

One of ordinary skill in the art should recognize that the number of bits in each $M_i$ need not be constant (i.e., k can be varied during the algorithm), the beam width B can be varied during the run of the decoder and that the depth of exploration can be varied during the run of the decoder. Further, other metrics can be used to decide what nodes to take to the beam, other than the minimum cost among the leaves. One example can be, if costs of nodes are $c_i$, to take $\Sigma e^{-\alpha c_i}$ for some value of α computed from the SNR of the channel. Still further, the symbols derived at step t need not depend only on the spine value $s_t$, but rather can depend on any information before step t. To illustrate, the symbols can be derived from both $s_t$ and $s_{t-i}$; in another example they can be derived from $s_{t-1}$ and $M_t$; in another example can be derived directly from all $M_1$, $M_2$, ... $M_t$. All these examples preserve the sequential nature of spinal codes, and allow the decoder to "replay" the encoder.

Figure 10:
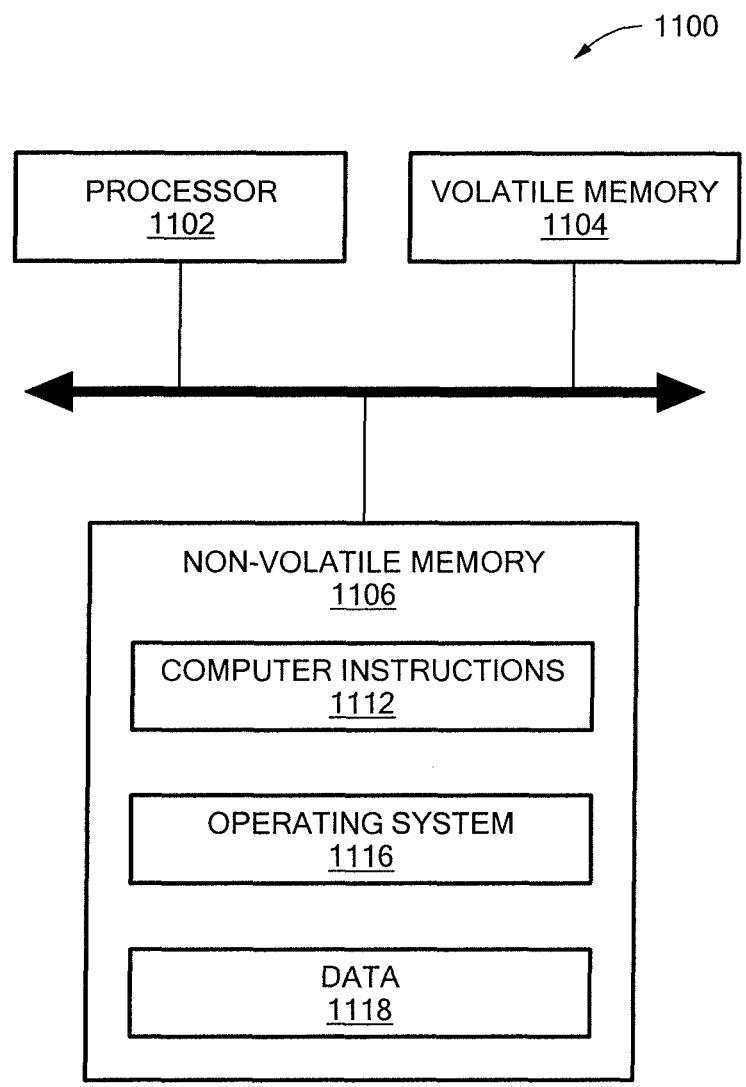
FIG. 10 is a block diagram of an example of a communication device.

Referring to FIG. 10, an example of an implementation of the transmitting device 110, the receiving device 120 or both is a communications device 1100. The communications device 1100 includes a processor 1102, a volatile memory 1104 and a non-volatile 1106. The non-volatile memory 1106 stores computer instructions 1112, an operating system 1116 and data 1118. In one example, the computer instructions 1112 are executed by the processor 1102 out of memory 1104 to perform all or part of the processes described herein (e.g., process 300, 500, 700 and 1000).

The processes described herein are not limited to use with the hardware and software of FIG. 10; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 300, 500, 700, and 1000 are not limited to the specific processing order of FIGS. 2, 4A, 6 and 9, respectively. Rather, any of the processing blocks of FIGS. 2, 4A, 6 and 9 may be re-ordered, combined or removed, performed in parallel or in serial, as necessary, to achieve the results set forth above.

It should be appreciated by one of ordinary skill in the art that other methods of deciding when to transmit may be used than RLP. For example, any estimate of the distribution of the amount of symbols required to successfully decode may be used. In one particular example, a CDF of the underlying code may be used or an estimate of such a CDF.

The processing blocks in FIGS. 2, 4A, 6 and 9 associated with implementing the system may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)). Elements of different embodiments described herein may be combined to form other embodiments not specifically set forth above. Other embodiments not specifically described herein are also within the scope of the following claims.

What is claimed is:

1. A method to decode comprising:
receiving encoded constellation symbols from an encoder configured to encode message bits using a spinal code which uses a function to encode the message bits to symbols and map the symbols to constellation points using a constellation mapping to form the encoded constellations symbols for transmission;
mapping the encoded constellation symbols to points on an I-Q plane; and
decoding the points on the I-Q plane using the constellation mapping to generate a decoded message.

2. The method of claim 1 wherein the decoding comprises:
exploring a decoding tree iteratively; and
pruning at each iteration all but a defined amount of nodes.

3. The method of claim 1, further comprising providing feedback to the encoder.

4. A decoder comprising:
a non-transitory machine-readable medium that stores executable instructions, the instructions causing a machine to:
receive encoded constellation symbols from an encoder configured to encode message bits using a spinal code which uses a function to encode the message bits to symbols and map the symbols to constellation points using a constellation mapping to form the encoded constellations symbols for transmission;
map the encoded constellation symbols to points on an I-Q plane; and
decode the points on the I-Q plane using the constellation mapping to generate a decoded message.

5. The decoder of claim 4 wherein the instructions causing the machine to decode comprises instructions causing the machine to:
explore a decoding tree iteratively; and
prune at each iteration all but a defined amount of nodes.

6. The decoder of claim 4, further comprising instructions causing a machine to provide feedback to the encoder.

7. An apparatus comprising:
a receiver to receive encoded constellation symbols from an encoder configured to encode message bits using a spinal code which uses a function to encode the message bits to symbols and map the symbols to constellation points using a constellation mapping to form the encoded constellations symbols for transmission;
a decoder configured to map the encoded constellation symbols to points on an I-Q plane and decode the points on the I-Q plane using the constellation mapping to generate a decoded message.

8. The apparatus of claim 7 wherein the decoder is further configured to:
explore a decoding tree iteratively; and
prune at each iteration all but a defined amount of nodes.

9. The apparatus of claim 7, wherein the decoder is further configured to cause a machine to provide feedback to the encoder.

* * * * *